(12) United States Patent
Smith et al.

(10) Patent No.: US 12,319,015 B2
(45) Date of Patent: Jun. 3, 2025

(54) ZONAL LAMINATION FOR COMPOSITE PARTS IN A MOVING LINE

(71) Applicant: The Boeing Company, Chicago, IL (US)

(72) Inventors: Daniel R. Smith, Woodinville, WA (US); Darrell D. Jones, Mill Creek, WA (US); Michael Kenneth-Que Louie, Renton, WA (US); Richard Allen Miller, II, Seattle, WA (US); Jordan Seth Erickson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 544 days.

(21) Appl. No.: 17/454,257

(22) Filed: Nov. 10, 2021

(65) Prior Publication Data

US 2022/0152947 A1    May 19, 2022

Related U.S. Application Data

(60) Provisional application No. 63/115,033, filed on Nov. 18, 2020.

(51) Int. Cl.
*B29C 70/38* (2006.01)
*B29C 70/54* (2006.01)
(Continued)

(52) U.S. Cl.
CPC .......... *B29C 70/384* (2013.01); *B29C 70/545* (2013.01); *B29K 2105/0881* (2013.01); *B29K 2307/04* (2013.01); *B29L 2031/3076* (2013.01)

(58) Field of Classification Search
CPC ... B29C 70/384; B29C 70/545; B29C 70/304; B29C 70/342; B29C 70/38;
(Continued)

(56) References Cited

U.S. PATENT DOCUMENTS

| 4,133,711 A | * | 1/1979 | August | B29C 70/545 |
| | | | | 156/367 |
| 8,974,618 B1 | * | 3/2015 | Rotter | B29D 99/0025 |
| | | | | 156/196 |

(Continued)

FOREIGN PATENT DOCUMENTS

| DE | 102010015027 A1 | 10/2011 |
| EP | 3173218 A1 | 5/2017 |
| EP | 3406431 A1 | 11/2018 |

OTHER PUBLICATIONS

Netherlands Patent Office Written Opinion and Search Report with English Translation, dated Sep. 1, 2021, regarding Application No. NL2028102, 12 pages.

*Primary Examiner* — George R Koch
*Assistant Examiner* — Christopher C Caillouet
(74) *Attorney, Agent, or Firm* — Yee & Associates, P.C.

(57) ABSTRACT

Systems and methods are provided for fabricating composite parts. The method includes subdividing a laminate into zones, laying up tows of fiber reinforced material for the laminate over a layup mandrel via multiple laminations such that each lamination head applies tows in a different zone, and splicing the zones together to form the laminate during the laying up of the tows while moving the layup mandrel in a process direction during fabrication of the composite parts.

34 Claims, 14 Drawing Sheets

(51) Int. Cl.
　　　*B29K 105/08*　　　(2006.01)
　　　*B29K 307/04*　　　(2006.01)
　　　*B29L 31/30*　　　(2006.01)

(58) Field of Classification Search
　　　CPC ............... B29C 70/382; B29C 70/222; B29K
　　　　　　　　　　2105/0881; B29K 2307/04; B29L
　　　　　　　　　　　　2031/3076; B29L 2031/3085
　　　See application file for complete search history.

(56) References Cited

U.S. PATENT DOCUMENTS

| | | |
|---|---|---|
| 2010/0193103 A1 | 8/2010 | McCowin |
| 2017/0144384 A1* | 5/2017 | Engel .................... B29C 70/388 |
| 2021/0107238 A1* | 4/2021 | Saini .................. B29D 99/0014 |
| 2021/0206122 A1* | 7/2021 | Kawabe ................ B29C 70/545 |

* cited by examiner

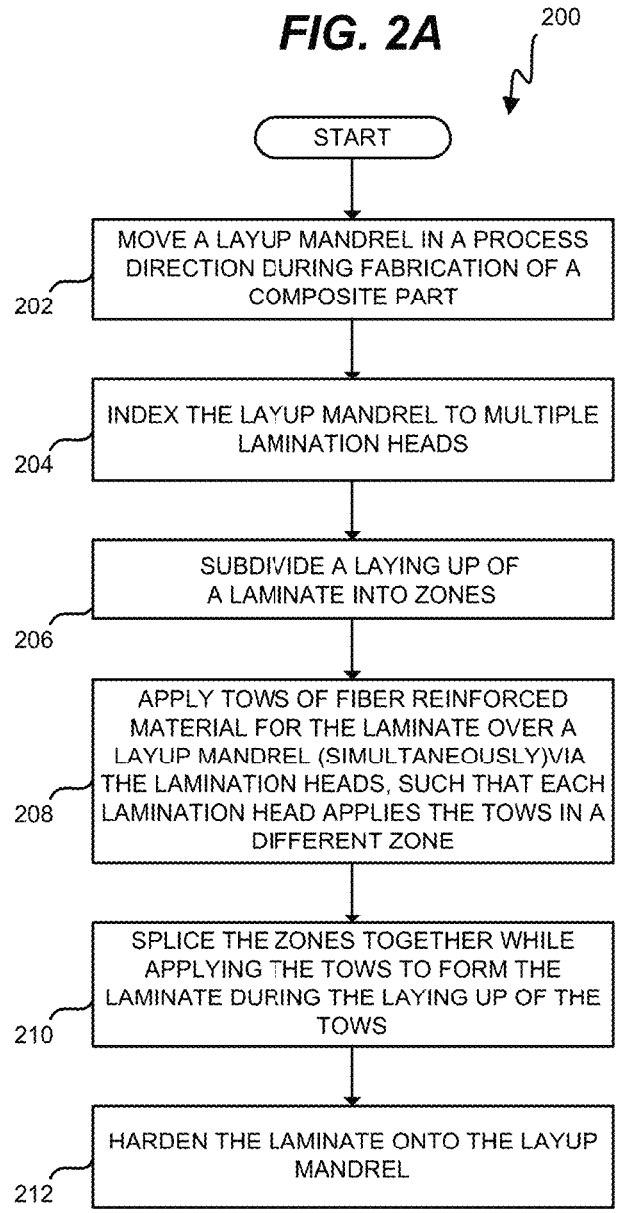

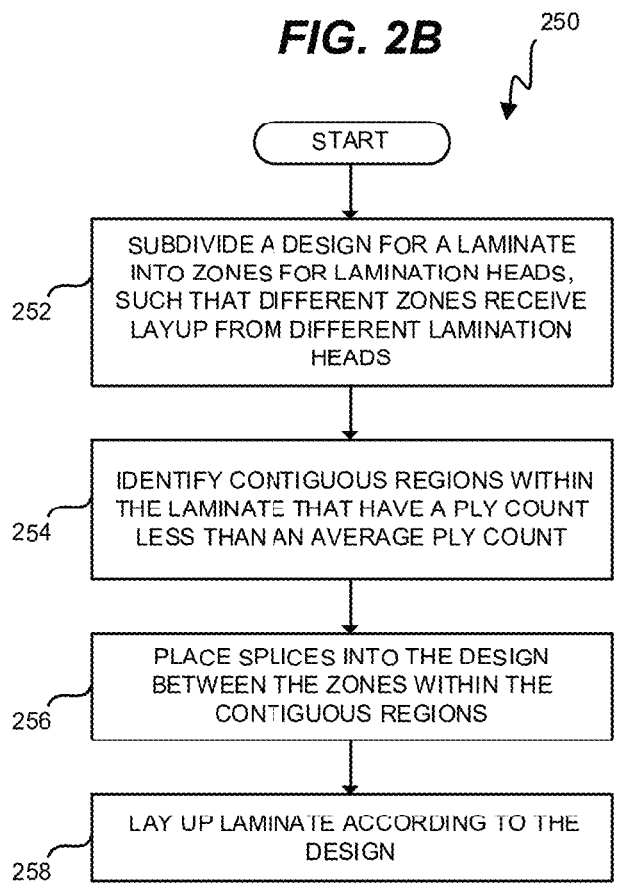
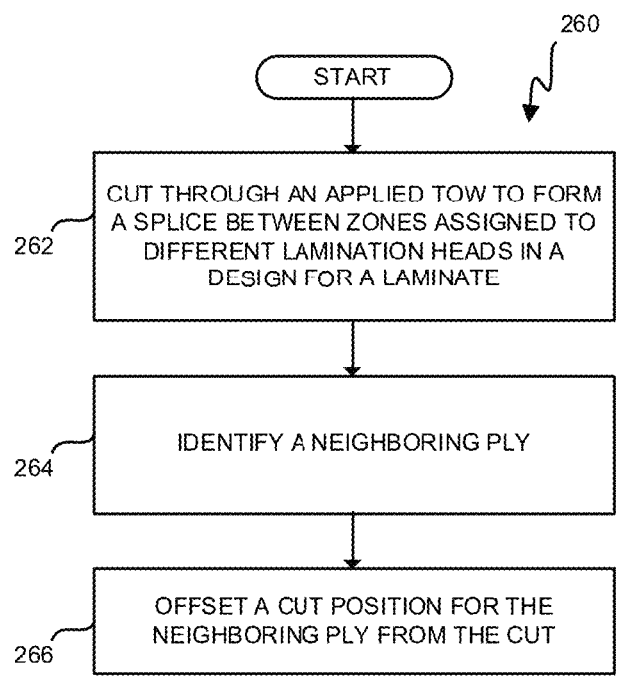

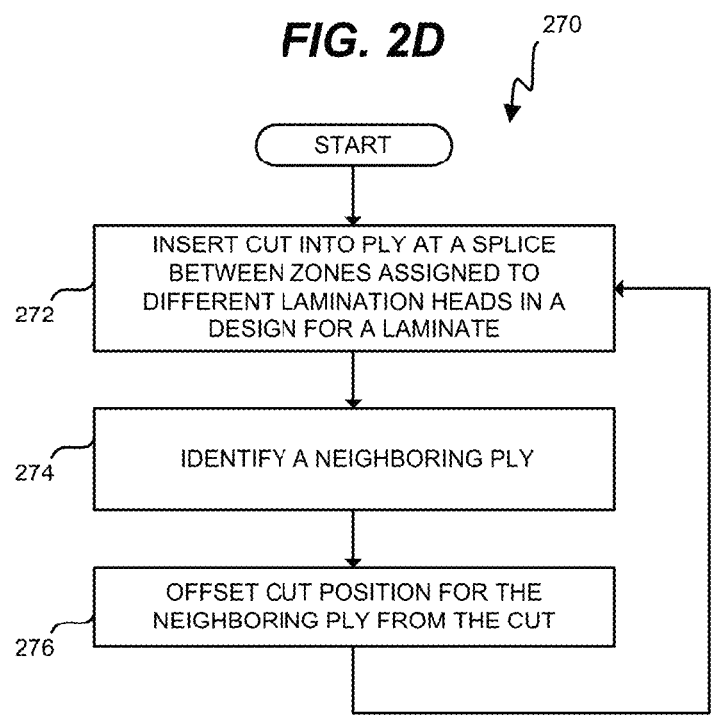

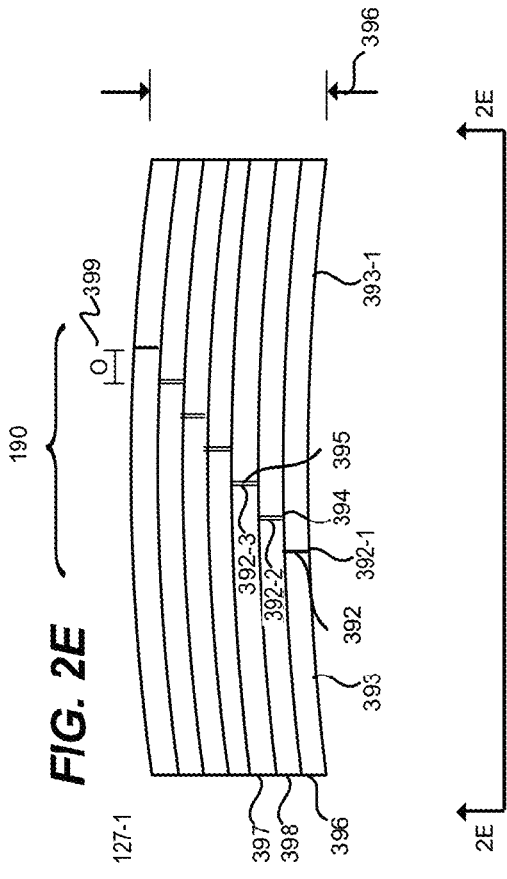
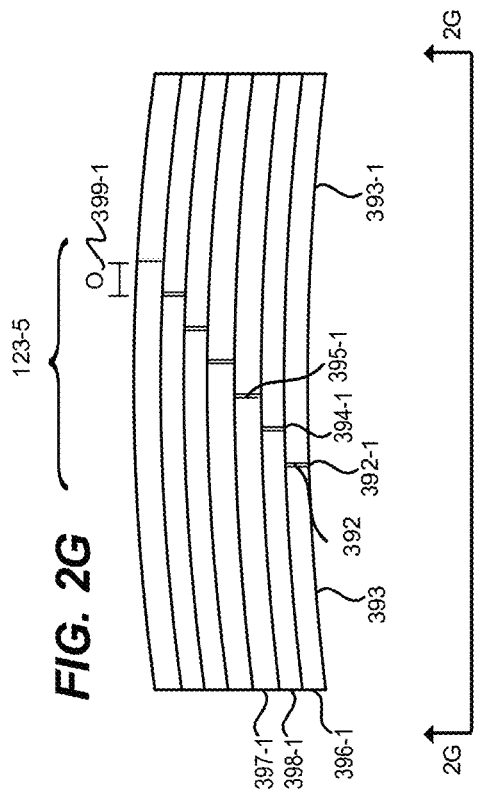

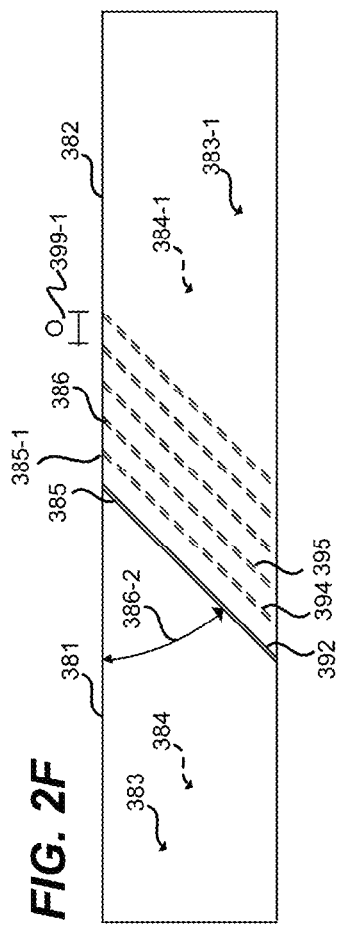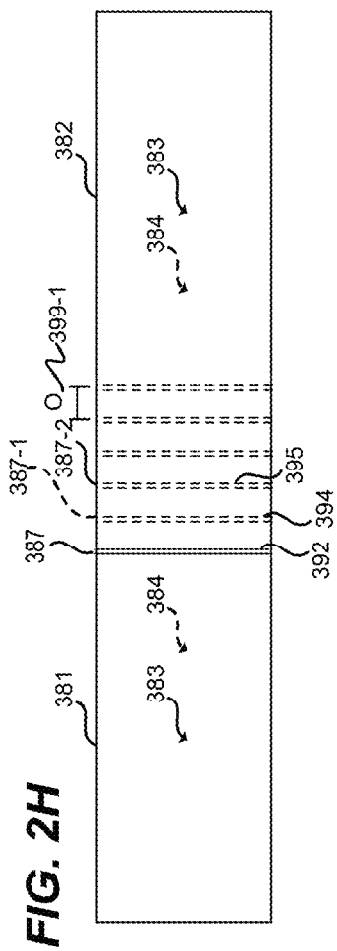

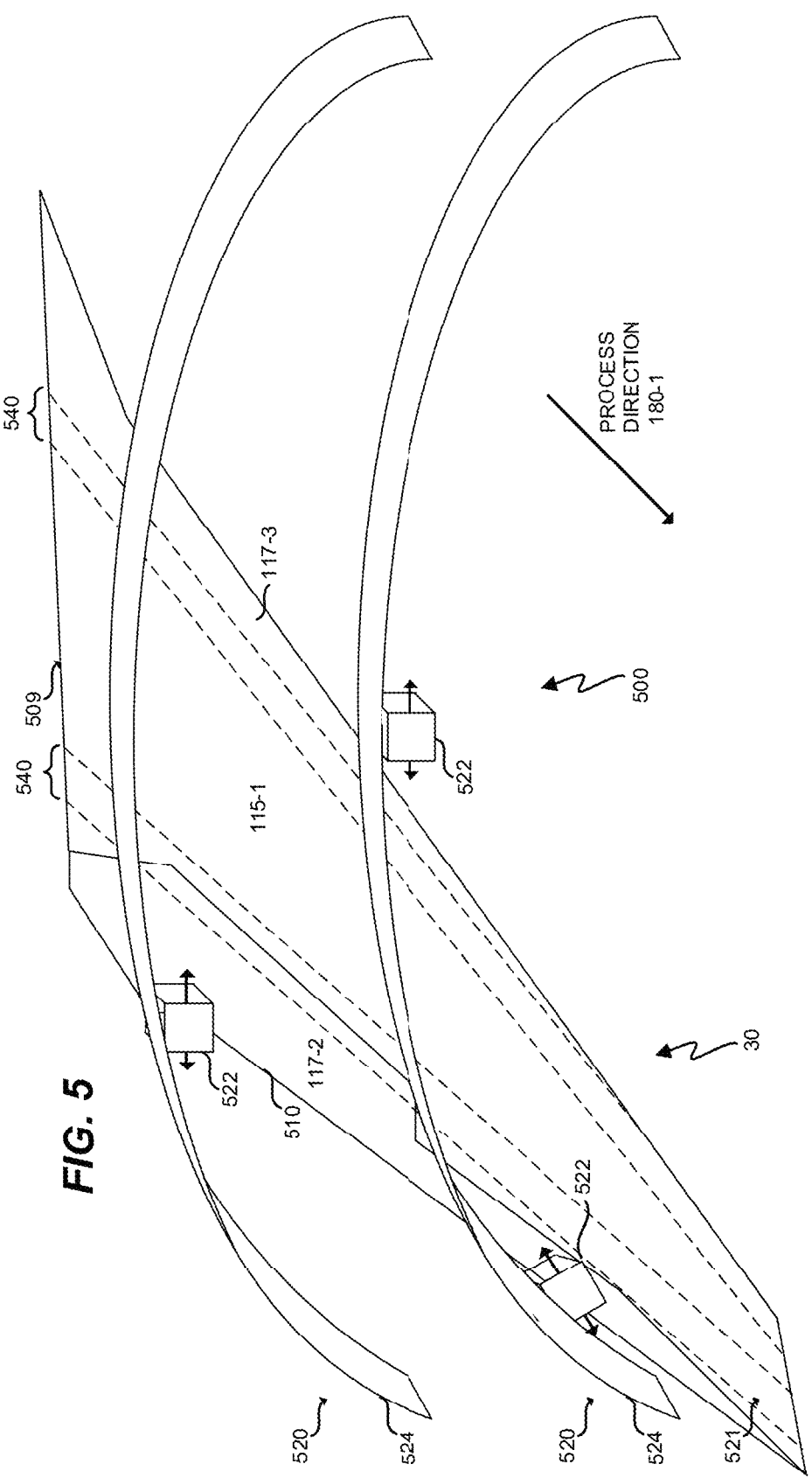

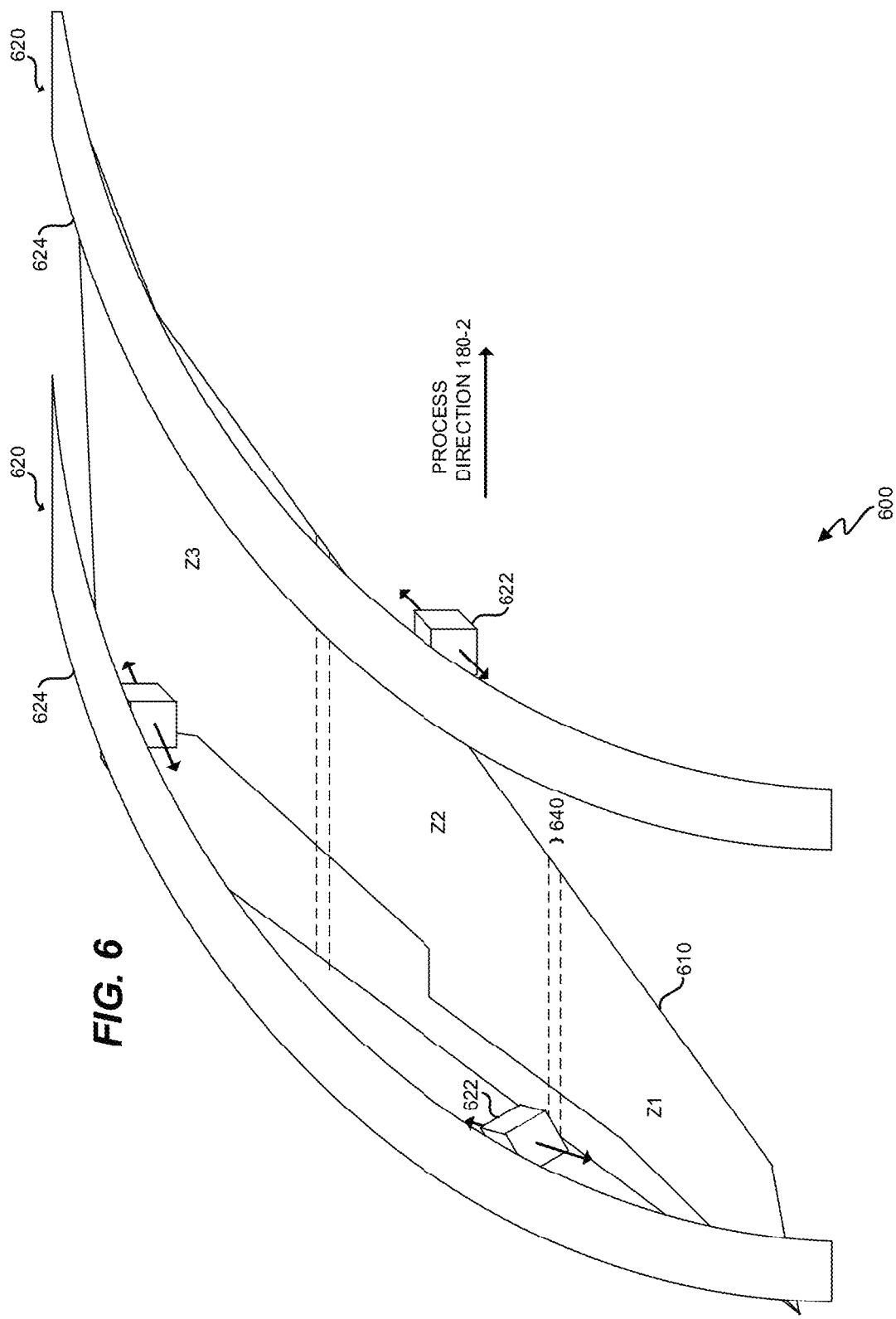

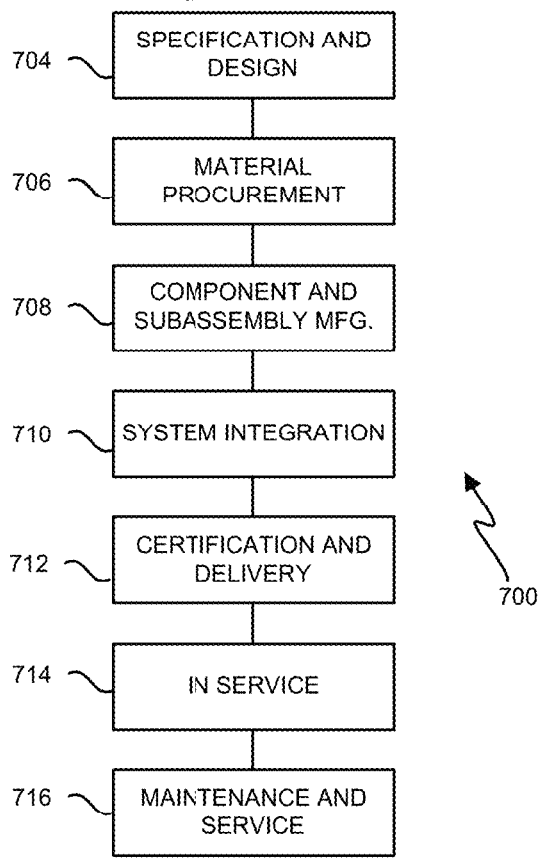
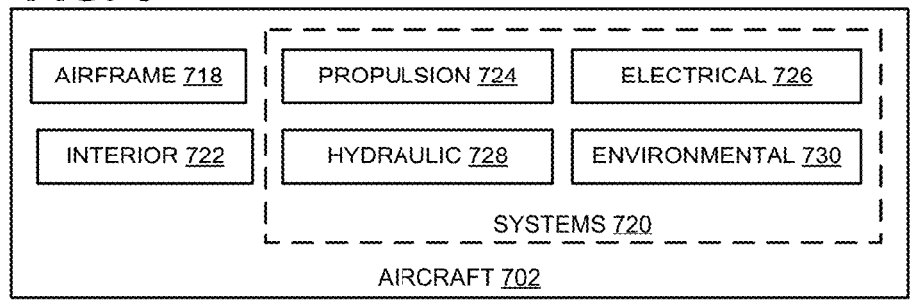

ZONAL LAMINATION FOR COMPOSITE PARTS IN A MOVING LINE

CROSS-REFERENCE TO RELATED APPLICATION

This application claims the benefit of U.S. Provisional Patent Application Ser. No. 63/115,033, filed Nov. 18, 2020, and entitled "Zonal Lamination for Composite Parts in a Moving Line;" which is incorporated herein by reference in its entirety.

FIELD

The disclosure relates to the field of aircraft, and in particular, to fabrication of aircraft components.

BACKGROUND

Large composite parts, such as those spanning tens of feet, occupy substantial space within a factory floor. Laminates for these parts are laid up on a layup mandrel in a stationary work cell, where an Automated Fiber Placement (AFP) machine, comprising a massive end effector for a large robot arm, proceeds to add fiber-reinforced material on a tow-by-tow basis. The lone AFP machine traverses the entire part singularly according to an optimized layup pattern.

Present techniques for fabricating large composite parts therefore require a substantial amount of time in order for the layup mandrel to be indexed and then for a laminate to be laid-up. Therefore, it would be desirable to have a method and apparatus that take into account at least some of the issues discussed above, as well as other possible issues.

SUMMARY

Embodiments described herein provide for zone-based lamination which is accomplished via multiple lamination heads. By subdividing a laminate into zones and assigning the zones to different lamination heads that operate in tandem, overall production speed is enhanced. Furthermore, because the layup mandrel proceeds in a process direction during fabrication (e.g., by periodically "pulsing" in the process direction, or continuously moving in the process direction), the flow through the factory floor is enhanced. That is, transit time for a composite part may be utilized to perform work on the composite part, which enhances efficiency.

One embodiment is a method for fabricating a composite part. The method includes subdividing a laminate into zones, laying up tows of fiber reinforced material for the laminate over a layup mandrel via multiple lamination heads such that each lamination head applies tows in a different zone, and splicing the zones together to form the laminate during the laying up of the tows.

A further embodiment is a non-transitory computer readable medium embodying programmed instructions which, when executed by a processor, are operable for performing a method for fabricating a composite part. The method includes subdividing a laminate into zones, laying up tows of fiber reinforced material for the laminate over a layup mandrel via multiple lamination heads such that each lamination head applies tows in a different zone, and splicing the zones together to form the laminate during the laying up of the tows.

A further embodiment is an apparatus for fabricating a composite part. The apparatus includes a lamination station that enables lamination heads to follow a contour of a layup mandrel that moves in a process direction during fabrication of a composite part, and lamination heads disposed at the lamination station are configured to lay up fiber reinforced material onto the layup mandrel, the lamination heads being configured to operate in tandem to lay up fiber-reinforced material for a laminate in different zones at the layup mandrel and splice the zones together. In one embodiment, the lamination heads operate in tandem to simultaneously lay up the fiber-reinforced material while simultaneously splicing the zones together.

A further embodiment is a system for fabricating a composite part. The system includes a track that follows the contour of a layup mandrel that moves in a process direction during fabrication of the composite part, a lamination station that includes lamination heads that are movably mounted to the track and are configured to lay up fiber reinforced material onto the layup mandrel. The lamination heads are configured to operate in tandem to simultaneously lay up fiber-reinforced material for a laminate in different zones at the layup mandrel while simultaneously splicing the zones together.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2A is a flowchart illustrating a method for laying up laminates in an illustrative embodiment.

FIGS. 2B and 2C depicts flowcharts illustrating methods for selecting splice locations at a laminate in illustrative embodiments.

FIG. 2D is a flowchart illustrating a method for staggering cuts made for a splice in an illustrative embodiment.

FIG. 2E is an end view of a splice at a laminate in an illustrative embodiment.

FIG. 2F depicts overlapping angled butts between zones in an illustrative embodiment.

FIG. 2G is an end view of a splice at a laminate in an illustrative embodiment.

FIG. 2H depicts overlapping non-angled or straight butts between zones in an illustrative embodiment.

FIGS. 5-6 are perspective views of a fabrication environment for laying up wing skins in an illustrative embodiment.

FIG. 7 is a flow diagram of aircraft production and service methodology in an illustrative embodiment.

FIG. 8 is a block diagram of an aircraft in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibiting different fiber orientations can be used to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated. with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1A:
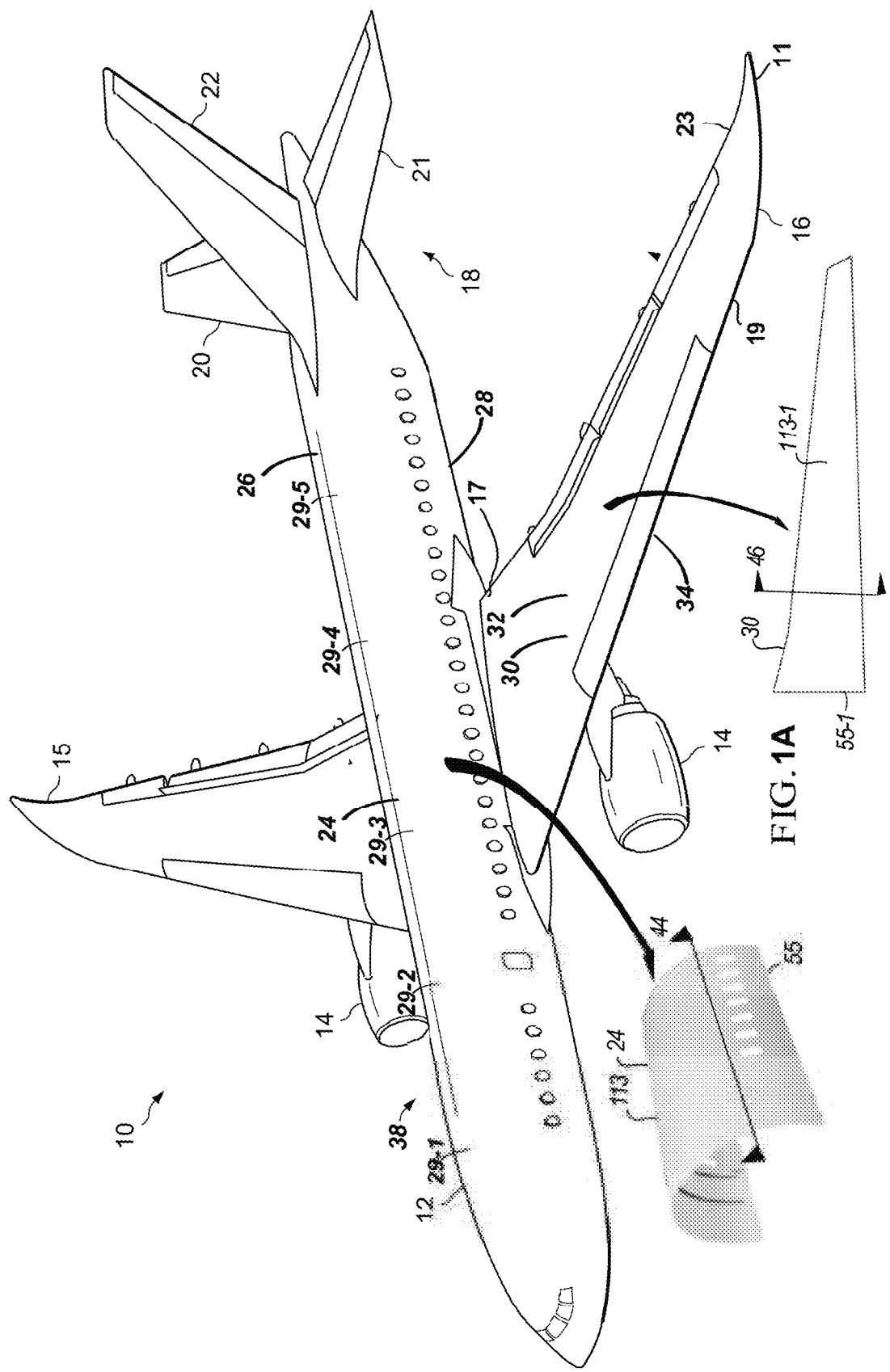
FIG. 1A is an illustration of an aircraft which can be manufactured with composite parts made in accordance with the methods, systems and apparatus described herein.

Turning now to FIG. 1A, an illustration of an aircraft is depicted in which an illustrative embodiment may be implemented. Aircraft 10 is an example of an aircraft 10 which is formed of half barrel sections 24 of fuselage 12.

In this illustrative example, aircraft 10 has a wing 15 and a wing 16 attached to a body 38. Aircraft 10 includes an engine 14 attached to the wing 15 and an engine 14 attached to the wing 16. Each wing 15, 16 has a tip 11 and a root 17. Each wing extends from fore 19 to aft 23.

Body 38 has a tail section 18. A horizontal stabilizer 20, a horizontal stabilizer 21, and a vertical stabilizer 22 are attached to the tail section 18 of body 38.

Fuselage 12 is fabricated from half barrel sections 24 with an upper half barrel section 26 joined to a lower half barrel section 28 to form a full barrel section 29-1, 29-2, 29-3, 29-4, 29-5. The full barrel sections are joined serially to form fuselage 12.

Wing 15 and 16 are each formed of a wing panel 30 comprising upper wing panel 32 and a lower wing panel 34 joined together.

Figure 3A:
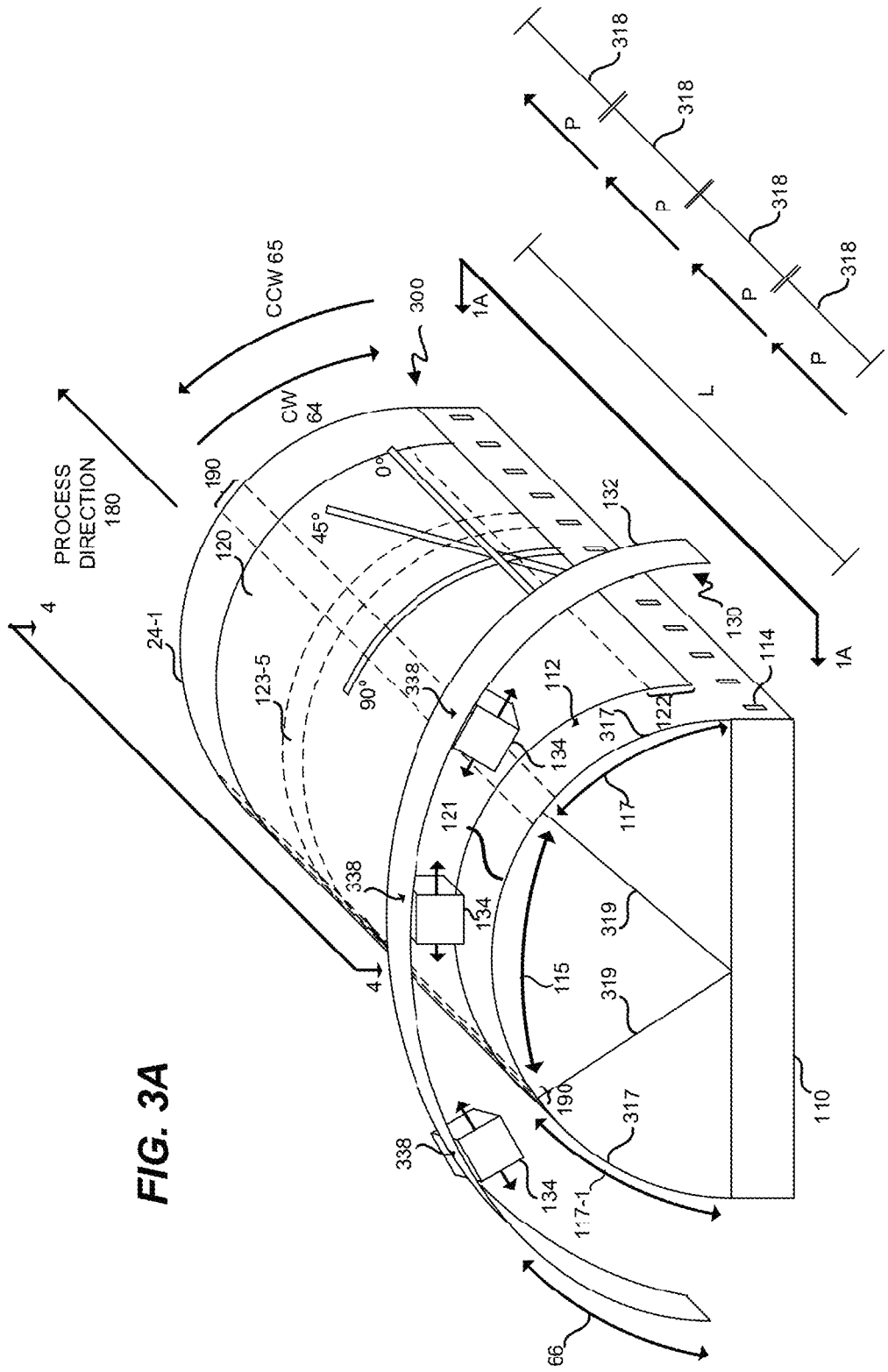
FIG. 3A is a perspective view of a fabrication environment for laying up sections of fuselage in an illustrative embodiment.

FIG. 3A is a perspective view of a fabrication environment 300 for laying up a half-barrel section preform 24-1 is depicted. In this embodiment, a layup mandrel 110 includes a surface 112 which has been precisely formed to a desired contour. The layup mandrel 110 also includes machined features 114 which facilitate indexing into half-barrel section preform 24-1 manufacturing excess 122. A laminate 120 is laid-up onto the surface 112 as the layup mandrel 110 proceeds in the process direction 180. For example, laying up a half-barrel section preform 24-1 is performed by lamination station 130 during pauses between micro pulses, pulses, or during continuous movement of the layup mandrel 110. The laminate 120 includes a manufacturing excess 122. The manufacturing excess 122 may receive indexing features via machining after the laminate 120 has been hardened, or may receive indexing features imparted by surface 112 into manufacturing excess 122. Manufacturing excess 122 includes the strip shown on FIG. 1B along with the door cut-out region 375 and window cut-out region 378 shown in FIG. 3B.

The half-barrel section preform 24-1 discussed above is performed via lamination heads 134, which are disposed along a track 132. In one embodiment, the lamination heads 134 initiate tow 124, 124-1 placement in one radial position, and work in a counterclockwise 65 direction until stopping. In one embodiment, the lamination heads 134 proceed to perform layup within their corresponding zones in a hoopwise 66 direction as the lamination heads 134 perform coordinated sweeps in clockwise 64 or counterclockwise 65 directions (or both). In one embodiment, the lamination heads 134 initiate in one radial position, and work in a clockwise 64 direction until stopping at the far end. The lamination head 134 may perform multiple passes in this manner to apply multiple tows 124, 124-1 at a variety of fiber orientations. The lamination head 134 is then paused until the next micro pulse, pulse, continuous movement of the structure and work in a clockwise 64 direction toward the starting point. The sweep of the lamination head 134 in one direction and then return in the opposite direction is an efficiency of motion which reduces movement to only what is necessary for placement of tow 124, 124-1. A single lamination head 134 can be removed and replaced, then receive maintenance while its replacement continues to perform.

The discussion provided herein is in no way limited to requiring all lamination heads to operate in the same direction at the same time. The zones provide herein make it possible for the lamination heads 134 to apply different layup orientation and/or patterns layups at the same time. This is particularly relevant, because different zones will perform different layup requirements in the form of different skin thicknesses, differing pad ups, the inclusion of doublers and sacrificial plies, etc. Thus, layup is not necessarily uniform from end to end or along hoop-wise 66 direction.

Figure 1B:
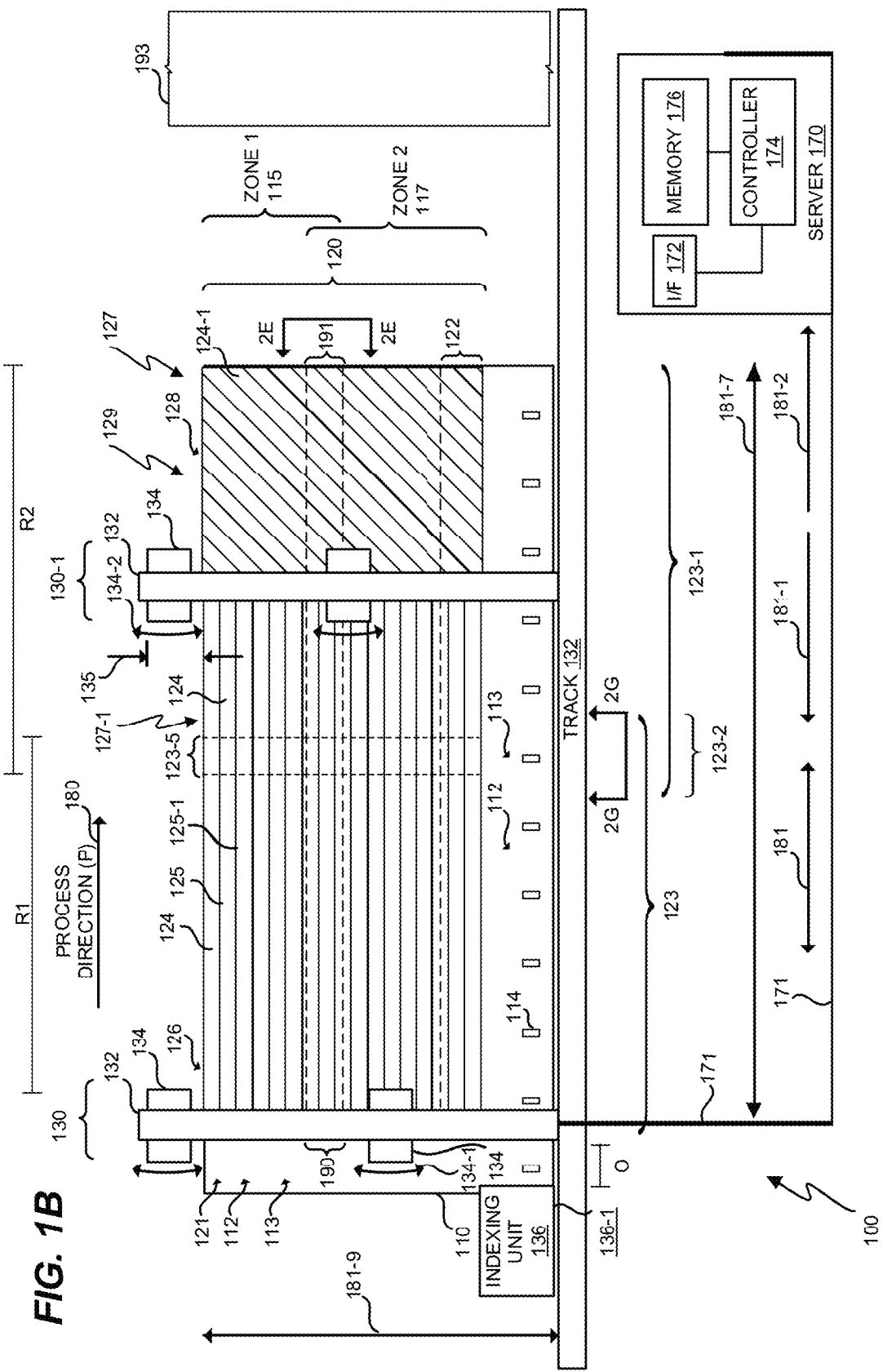
FIG. 1B is a block diagram of a fabrication environment for laying up laminates that will be hardened into composite parts in an illustrative embodiment.

FIG. 1B is a block diagram of a fabrication environment 100 for laying up laminates that will be hardened into composite part 55, 55-1 in an illustrative embodiment. Fabrication environment 100 comprises any system, device, or component operable to utilize mobile lamination heads in a synchronous manner to perform layup of a laminate 120 onto a surface 112 of a layup mandrel 110 that proceeds in a process direction 180 during fabrication. The layup mandrel 110 would already have a plurality of stringers (not shown) placed longitudinally 181 into and forming part of the surface 112. The stringers are placed upstream 181-1 of the lamination station 130, 130-1. The lamination station 130, 130-1 layup upon the layup mandrel 110 and the stringers. The surface 112 forms a half barrel section preform 129 (i.e., a half-cylinder) when viewed from the end, and may define an Inner Mold Line (IML) 121 for a half barrel section preform 129. In the view shown in FIG. 1B, only the near side of the layup mandrel 110 and the laminate 120 are shown. Thus, the entirety of Zone two 117 is shown, only a portion of Zone one 115 is shown, and none of a far side Zone three 117-1 is shown. Reference is made to FIG.

3A which shows Zone one 115, Zone two 117 and Zone three 117-1 that are delineated by lines 319. In this embodiment, the layup mandrel 110 proceeds along a track 132, such as a layup mandrel 110 conveyance, during fabrication. The layup mandrel 110 may be pulsed incrementally such as a micro pulse of less than layup mandrel 110 length 181-7 or a pulsed of its entire length 181-7 in the process direction 180. In such embodiments, work performed upon the layup mandrel 110 may be performed during pauses between pulses. In further embodiments, the layup mandrel 110 proceeds continuously in the process direction 180. The layup mandrel 110 defines a contour 113, 113-1 for a half barrel section 24 and a wing panel 30, (FIG. 1A) respectively. In further embodiments, the layup mandrel 110 defines an Outer Mold Line (OML) 521 (FIG. 5) of a wing panel 30.

A lamination station 130, 130-1 lays up tows 124 of fiber-reinforced material (e.g., Carbon Fiber Reinforced Polymer or Carbon Fiber Reinforced Plastic CFRP) onto the layup mandrel 110 via multiple lamination heads 134. In this embodiment, the multiple lamination heads 134 are disposed along a track 132 (e.g., a shared track), although in further embodiments the lamination heads 134 do not share a track 132, but rather independently utilize one track 132 per lamination head 134 and hence lay up the tows from independent tracks. Furthermore, while only one lamination station 130 is shown in a longitudinal region 123, 123-1, multiple lamination stations 130, 130-1 or lamination heads 134 may be arranged longitudinally 181 to perform work at the same time or synchronously in series. Furthermore, the lamination heads 134 may be arranged longitudinally 181 and/or circumferentially in series and/or in parallel. The tracks 132 may be provided at different offsets 135 from the layup mandrel 110, and can be arranged such that a track 132 and a lamination head 134 are capable of passing by another track 132 and another lamination head 134 so as to improve versatility and avoid collisions, especially in splice zones 190, 123-5. The lamination heads 134 each follow a track 132 during layup, and may include internal actuators or other components (not shown) for facilitating movement across the track 132, which itself may move longitudinally 181 relative to the layup mandrel 110. In one embodiment, the track 132 complementary to the contour 113, 113-1 of the layup mandrel 110. During layup, the lamination heads 134 operate in tandem to apply tows 124 in a parallel process to layup in zone one 115, zone two 117 and zone three 117-1 and/or longitudinal region 123, 123-1 on the layup mandrel 110 in order to fabricate laminate 120, which will be hardened into a half barrel section preform 24 or wing panel 30. In this embodiment, the visible layer of the laminate 120 comprises forty-five degree tows 124-1, although other layers may include tows 124 arranged at different fiber orientations than the tows 124 illustrated at zero degree orientation.

The lamination heads 134 may each operate in overlapping zones 191, 123-2 with neighboring lamination heads 134.3921-1 Splice zones 190, 123-5 at overlap zones 191, 123-2 to be performed in a manner that enables the creation of splice zones 190 and 123-5, without the risk of lamination head 134 collision. The lamination heads 134 operate in coordination to not just lay up the zone one 115, zone two 117 and longitudinal region 123, 123-1 but also to layup splices 392, 394, 395, 392-1, 394-1, 395-1 in the splice zones 190, 123-5 to form an integral laminate 120. Furthermore, the lamination heads 134 may move at particular orientations (e.g., 0°, +/−45°, 90°, etc.), or may be specialized to lay tows at only one orientation. In one embodiment, different lamination stations 130, 130-1 include different combinations of lamination heads 134. For example, an upstream 181-1 lamination station 130-1 may include five lamination heads 134, with one lamination head 134 for the zone one 115, and two lamination heads 134 for each of zone two 117 and zone three 117-1. A downstream 181-2 lamination station 130 may include three lamination heads 134 such as one lamination head 134 for the zone one 115, and one lamination head for each zone two 117 and zone three 117-1. In still further embodiments, the lamination heads 134 are used as end effectors of robot arms (not shown) that sweep across the laminate 120 without the need for a track 132. The lamination head 134 would be paired with the robot arms in a one-to-one relationship.

In this embodiment, laminate 120 includes manufacturing excess 122, which may receive indexing features such as holes, slots, or pins after it is hardened or formed into laminate 120 by surface 112 during layup and processing, in order to facilitate indexing of the composite part 55, 55-1 to post hardening assembly work stations after the composite part 55, 55-1 has been removed from the layup mandrel 110. Unlike prior systems that relied upon one monolithic AFP machine, the fabrication environment 100 depicted in FIG. 1B provides a technical benefit, divides the layup work into several regions amongst several lamination heads 134 and joins the regions together with splices because it reduces the size of a single layup region into as small region for efficiency, which enables multiple lamination heads to operate at once, and then unify borders between regions with scarf or step overlaps. Furthermore, the multiple lamination head 134 system described herein facilitates the use of smaller, lighter, specialized lamination heads 134 which are less complex than traditional AFP heads and therefore have less bulk to maneuver, and less complexity. This may permit the lamination heads 134 to move more quickly and more precisely, and also increases reliability and ease of maintenance.

The lamination heads 134 can be designed to perform a variety of movements relative to the layup mandrel 110. For example, the lamination heads 134 can be moved while the layup mandrel 110 remains stationary, the layup mandrel 110 could be moved relative to fixed lamination heads 134, or a combination of layup mandrel 110 and lamination head 134 movement relative to each other can be utilized to facilitate layup.

Track 132 has a contour complementary to the layup mandrel 110, and may comprise a rigid track that is disposed at a known offset O from an indexing unit 136. The indexing unit 136 mates with machined features 114, for instance slots, blind holes, holes, pins, at the layup mandrel 110 in order to precisely index the layup mandrel 110 to the lamination station 130, 130-1. While only two lamination stations 130, 130-1 are depicted in FIG. 1B, in further embodiments more lamination stations 130, 130-1 are arrayed in the process direction 180 (i.e., longitudinally 181). In additional, in an embodiment, to lamination stations 130, 130-1 on the pre-autoclave side is a vacuum bag installation station (not shown) followed by a caul plate installation station (not shown). Another embodiment has a caul plate performing the dual function of the caul plate and the vacuum bag. In one embodiment, a lamination station 130 downstream 181-2 of the current lamination station 130-1 includes a single lamination head 134 for performing any desired re-work or additional layup. The single lamination head 134 may perform additional layup that was missed if an upstream 181-1 lamination head 134 is lagging. In still further embodiments, each lamination station 130, 130-1 is capable of moving back and forth in the process direction 180 to facilitate layup processes. In still further embodiments, fewer lamination heads 134 are disposed in zone one 115 than in zone two 117 or zone three 117-1. As there is often a less complex layup and/or fewer plies in zone one 115, fewer lamination heads 134 may be utilized for layup at a zone one 115 than in zone two 117 and zone three 117-1.

FIG. 1B further depicts a lamination server 170 which controls the operations of the lamination station 130, 130-1. In this embodiment, the lamination server 170 includes an interface 172, optionally comprising wired connection 171 such as an ethernet interface, Universal Serial Bus (USB) interface or wireless interface for communicating with the lamination station 130, 130-1 and/or indexing unit 136. The lamination server 170 includes a memory 176 that stores one or more Numerical Control (NC) programs for operating the lamination station 130, 130-1. In one embodiment, the NC programs mitigate collision risk by ensuring that multiple lamination heads 134 do not operate close enough to each other to collide. Coordinating the operations of the more than one lamination heads 134 to ensure that multiple lamination heads 134 do not collide during operation. Pairing up one track 132 per lamination head 134 with various offsets 135 reduces the complexity of guiding the lamination heads 134 through overlap zones 191, 123-2 by avoiding more than one lamination head 134 per one track 132 within overlap zones 191, 123-2. The various offsets 135 permits one track 132 to pass under another track 132. In still further embodiments, the lamination heads 134 include sensors that detect proximity to other lamination heads 134, and the lamination heads 134 are halted and/or moved away in the event that they come closer than a threshold proximity to each other. Controller 174 manages the operations of lamination server 170 by processing feedback from lamination station 130, 130-1 and/or indexing unit 136, and providing instructions based on such feedback. Controller 174 may be implemented, for example, as custom circuitry, as a hardware processor executing programmed instructions, or some combination thereof.

FIG. 1B further illustrates a splice zone 190 between zone one 115 and Zone two 117 and similarly, there is a splice zone not shown between zone one 115 and zone three 117-1. While the splice zone 190 is shown arranged longitudinally 181, a circumferential splice (FIG. 1B), such as hoop-wise, splice zone 123-5 disposed along the length 181-7 of the laminate 120 may be used at overlap region 123-2 between longitudinal region 123, 123-1. In further embodiments, splice zone 123-5 are omitted within zone one 115 of the laminate 120 as a single lamination head 134 on a dedicated track 132 with an appropriate offset 135 may apply all of the tows 124, 124-1 negating the need to splice. Furthermore, while the laminate 120 is shown as short length 181-7 in relation to its height 181-9, in one embodiment the laminate 120 length 181-7 extends, for example, twenty-five feet and in another embodiment the length 181-7 extends up to forty feet or longer. Thus, a first set of lamination heads 134 in lamination station 130 may lay up plies 126 at a first region R1 along a length 181-7 of the laminate 120. First region R1 would coincide with longitudinal region 123. Then, the laminate 120 is micro pulsed in a process direction 180 until the longitudinal region 123 reaches coincides with second region R2 and within the purview of another set of lamination heads 134 in lamination station 130-1 while at the same time longitudinal region 123-1 micro pulses to coincide with third region R3 (not shown) and into the purview of lamination station 130-N (not shown). Similarly, the mandrel is advanced in process direction 180 from lamination station 130, 130-1 to lamination station 130-N until laminate 120 is completed. Micro pulse is an advancement of the layup mandrel 110 and laminate 120 by less than length 181-7 in process direction 180. In the illustrated embodiment, the micro pulse is about half the length 181-7. Other embodiments with more closely arranged lamination stations (130, 130-1) have a micro pulse of about one third or less of the length 181-7. A full pulse is an advancement of the layup mandrel 110 and laminate 120 by its length 181-7 in process direction 180. After the micro pulse, first region R1 becomes second region R2 and the lamination station 130-1 builds upon the tows 124 placed by lamination station 130 in the first region R1 by adding additional tows 124, 124-1 thereto while the lamination station 130 lays down plies 128 for a next region R2 of the laminate 120. Furthermore, the lamination stations 130, 130-1 and/or lamination heads 134 may be positioned and/or pulsing of the laminate 120 may be coordinated to enable operation within splice zones 190, 123-5 as desired. Each splice may comprise a scarf splice (not shown, lap splice 392-1, or step lap splice (not shown), and may vary in thickness as compared to un-spliced plies 396, 397, 398.

Unlike layups using a single AFP machine which dispenses tows 124, 124-1 for a ply of a laminate over length 181-7 and height 181-9, the lamination heads 134 are each dedicated to the particular zone one 115, zone two 117, zone three 117-1 or longitudinal region 123 or 123-1 or sets thereof. This reduces the potential for collision risk while increasing layup efficiency. To accommodate this increased aggregate speed of layup using multiple lamination heads 134, and to enable fabrication of a single integral laminate 120, the particular zone one 115, zone two 117, zone three 117-1 or longitudinal region 123 or 123-1 are spliced together.

In some embodiments, as is shown in FIGS. 2E-2H, the splice zones 190, 123-5 have layup splices 392, 394, 395, staggered by overlaps 399, 399-1 from adjacent plies from plies 396, to ply 398 to ply 397 and so on through laminate 120. In this arrangement, tows 124, 124-1 of individual plies within splice zones 190, 123-5, such as ply segment 393 are terminated at layup splice 392 with an angled butt 385, 386 (see FIG. 2F) and a non-angled butt 387, 387-1 (see FIG. 2H) configuration as part of a lap splice 392-1 with no separation or a small separation (e.g., a fraction of an inch) from ply segment 393-1 at layup splice 392. The layup splice 392 has ply segment 393 and ply segment 393-1 cut and placed into a complementary angled butt 385, 386 and a non-angled butt 387, 387-1 configuration as part of a lap splice 392-1 with overlaps 399, 399-1 staggering in relation to the layup splice 394. This type of overlaps 399, 399-1 staggering of subsequent layup splices 392, 394, 395 provides the lap splice 392-1 that facilitates load transfer through splice zones 190, 123-5. Another embodiment has the splice in a scarf or step lap configuration (not shown). All splice types require the ply segment 393 and ply segment 393-1 to be trimmed into complementary alignment. Ply 396 has a layup splice 392 staggered from the ply 398 layup splice 394 and so forth for each subsequent ply of laminate 120. Furthermore, splice zones 190, 123-5 are located in less complex or thinner portions of the laminate 120, such as areas without window/door surrounds, pad ups or other complicated geometries. In this manner, splices are positioned between complex layup areas instead of within those areas. A splice may be thicker than the thickness of an un-spliced laminate 120, and hence the splice may comprise staggered joins of one or more cuts portions of ply through the thickness of the laminate 120. In further embodiments, the locations of cuts for individual plies 396, 398, 397 within a layup splice 392, 394, 395 are staggered relative to angled butt 385, 386 and non-angled butt 387, 387-1 for other plies in the splice zone 190, 123-5. This causes the layup splice 392, 394, 395 to be staggered across a distance of a multiple of overlaps 399, 399-1, which enhances load bearing properties of the lap splice 392-1. Staggering the positions of cuts of plies within a splice zone 190, 123-5 enhances the ability of the splice zone 190, 123-5 to bear load there through when hardened into a composite part 55, 55-1. After receiving layup, the layup mandrel 110 proceeds to an autoclave 193.

Illustrative details of the operation of fabrication environment 100 will be discussed with regard to FIG. 2A. Assume, for this embodiment, that layup mandrel 110 has been indexed but has not yet received any composite material and has just begun to proceed underneath track 132.

FIG. 2A is a flowchart illustrating a method 200 for laying up laminates in an illustrative embodiment. The steps of method 200 are described with reference to fabrication environment 100 of FIG. 1B, but those skilled in the art will appreciate that method 200 may be performed in other systems. The steps of the flowcharts described herein are not all inclusive and may include other steps not shown. The steps described herein may also be performed in an alternative order.

In step 202, the layup mandrel 110 is moved in a process direction 180, either continuously or in a pulsed fashion, to a lamination station 130, 130-1 during fabrication of a composite part 55, 55-1. Receiving the layup mandrel 110 may comprise a first region R1 of the layup mandrel 110 proceeding beneath the lamination station 130 or may comprise the layup mandrel 110 reaching a location where it may be indexed by the indexing unit 136.

In step 204, the indexing unit 136 indexes the layup mandrel 110 to the multiple lamination heads 134. This may be performed by placing a complementary feature 136-1 at the indexing unit 136 into one or more of the machined features 114 at the layup mandrel 110, in order to precisely determine a position of the layup mandrel 110 and surface 112 to the lamination station 130. Because an overlap offset O 399 of the indexing unit 136 is precisely known, the position of the layup mandrel 110 relative to the lamination station 130, 130-1 and any lamination heads 134 may be programmatically determined based on the position of the layup mandrel 110 relative to the indexing unit 136. Based on this information, an NC program at the controller 174 may be updated to account for any discrepancies of the layup mandrel 110 or surface 112 from an expected nominal orientation/position. The layup mandrel 110 may be repositioned relative to lamination station 130 and/or NC program to eliminate such discrepancies.

In step 206, laying up is subdivided into zone one 115, zone two 117, zone three 117-1 and longitudinal region 123, 123-1 by controller 174 and/or N/C program. Within each zone one 115, zone two 117, zone three 117-1 and longitudinal region 123, 123-1, a single lamination head 134 will be operated. By creating such zone one 115, zone two 117, zone three 117-1 and longitudinal region 123, 123-1 and limiting lamination head 134 movement to within the zone or region, layup may be performed independently by the lamination heads 134 at the lamination station 130, 130-1 and/or further lamination stations 130-n, without the need for complex sensing and collision avoidance. That is, because the lamination heads 134 do not operate in each other's zones and regions, and because the actions of the lamination heads 134 are coordinated with respect to each other, there is no chance of collision when the lamination heads 134 are run in parallel. The collision avoidance occurs even in environments including overlap zones 191, 123-2 in order to form layup splices 392, 394, 395. For example, a controller 174 may direct its lamination heads 134 to operate on the forward portion 127-1 of the zone one 115, zone two 117, zone three 117-1 and longitudinal region 123, 123-1 in parallel. The lamination heads 134 proceed to the aft portion 127 of their respective zone or longitudinal region in parallel, etc., in order to ensure that lamination heads 134 in longitudinal region 123 are not operated in close proximity to lamination heads 134 in longitudinal region 123-1 during layup.

In one embodiment, the controller 174 places splice zones 190, 123-5 at the overlap zones 191, 123-2 discussed above with regard to step 206. In one embodiment, the controller 174 places the splice zones 190, 123-5 in accordance with an NC program designed for the specific part at locations specified by a designer of the composite part 55, 55-1. The splice zones 190, 123-5 enable structural strength to be carried from one zone to a neighboring zone in a manner similar to a portion without a splice zone 190, 123-5. The splice zones 190, 123-5 facilitate zone one 115, zone two 117, zone three 117-1 and longitudinal region 123, 123-1 to be defined instead of one large lamination zone with no splices. The number of lamination zone one 115, zone two 117, zone three 117-1 and longitudinal region 123, 123-1 increases the rate of material being laid down. Thus, in one embodiment if each half-barrel fuselage is zonally laminated by three material layup zones, the rate of material placement can be increased by up to six-fold over a full barrel section that utilizes but one material placement device.

In step 208, tows 124, 124-1 of unidirectional fiber reinforced material for the laminate 120 are applied/laid-up over a layup mandrel 110 at the same time via the lamination heads 134, such that each lamination head 134 applies the tows 124, 124-1 in a zone one 115, zone two 117, zone three 117-1 and longitudinal region 123, 123-1. Thus, layup is applied either directly onto the layup mandrel 110 in a first layer ply 396 or is applied for a subsequent ply 398 atop the first layer ply 396. That is, controller 174 operates the lamination heads 134 concurrently and in synchronization, in accordance one or more stored NC programs to lay up tows 124, 124-1 for the laminate 120. During these operations, the lamination heads 134 precisely position the tows 124, 124-1 in order to ensure that gaps 125 and overlaps 125-1 between edges and starts and stops do not exceed desired tolerances. While tows 124 proceeding in the process direction 180 are shown in FIG. 1B, tows 124 are placed such that their fiber orientations (e.g., 0°, +45°, −45°, 90°) vary with respect to the laminate 120, depending on the layer being laid-up. The lamination heads 134 are also capable of motion lateral 134-1 relative to the track 132, to facilitate motion for the placement of 0° tows, and/or arcuate motion 134-2 relative to the track 132 for the placement of 45° tows. The layup process may be completed at a single lamination station 130 or may be performed in part by multiple lamination stations 130, 130-1, 130-n placed in series with respect to the process direction 180. In many instances, the multiple lamination stations 130, 130-1, 130-n process is desirable, as different portions of a fuselage 12 or wing 15, 16 of an aircraft may exhibit vastly different thicknesses owing to pad-ups. For example, a pad-up for a window or door surround, or at the wing root, or an access door, or a pad-up for an antenna may be substantially thicker than other regions of the laminate 120.

In step 210, the controller 174 operates the lamination heads 134 to splice the zones together while applying the tows 124. That is, at the same time with step 208, the lamination heads 134 splice the zones together during the laying up of the zones. This is done in order to form a single, integral laminate. Any suitable splice or joint may be prepared, such as a scarf joint (not shown), lap splice 392-1, step overlap (not shown), etc., and the overlap 399-1 sufficient to ensure high bond strength, such as a ramp rate 30:1 or higher ratio of overlap 399-1 to ply thickness may also be chosen. Furthermore, a "splice" may comprise angled butt 385, 386 or non-angled butt 387, 387-1 configuration, overlapping 399, 399-1, or otherwise stacking layers of zone one 115, zone two 117 and zone three 117-1 and longitudinal region 123, 123-1 against each other. This may be performed as a separate process, or may be integrated into step 208, such that tows 124, 124-1 from each of zone one 115, zone two 117 and zone three 117-1 and longitudinal region 123, 123-1 are extended into splice zones 190, 123-5 by a desired overlap 399, 399-1 amount or ramp rate, in order to form a splice between zone one 115, zone two 117 and zone three 117-1 and longitudinal region 123, 123-1.

In one embodiment, applying tows 124, 124-1 of fiber reinforced material to the layup mandrel 110 is performed simultaneously via lamination heads 134 at lamination stations 130, 130-1, wherein each of the lamination heads 134 applies tows 124, 124-1 in an assigned zone at the layup mandrel 110, and lamination heads 134 at different lamination station 130, 130-1, 130-*n* apply tows 124, 124-1 in different assigned zones and or regions. The steps of moving the layup mandrel 110, indexing the layup mandrel 110, and applying tows 124, 124-1 are then iteratively repeated. In such an embodiment, each lamination head 134 is assigned to the zone one 115, zone two 117 and zone three 117-1 and longitudinal region 123, 123-1 while applying tows 124, and the zone assigned to each lamination head 134 varies as the layup mandrel 110 proceeds in the process direction 180.

The process may further continue by moving the layup mandrel 110 further in the process direction 180, and applying additional tows 124, 124-1 of fiber reinforced material to the layup mandrel 110 simultaneously via the lamination heads 134 such that each lamination head 134 applies tows in a different zone. In still further embodiments, this may include moving the layup mandrel 110 further in the process direction 180, indexing the layup mandrel 110 to the lamination heads 134, and applying additional tows 124, 124-1 of fiber reinforced material to the layup mandrel 110 simultaneously via the lamination heads 134, wherein each of the lamination heads 134 applies tows in a new zone one of zones Z1-Z3 of FIG. 3A. Neighboring zones zone one 115, zone two 117 and zone three 117-1 and longitudinal region 123, 123-1 are then structurally united via the use of splice zones 190, 123-5).

The completed laminate 120 is compacted, and proceeds into the autoclave 193. At the autoclave 193, the laminate 120 is hardened onto the layup mandrel 110 in step 212 to form a composite part 55, 55-1. The composite part 55, 55-1 is then demolded, machined, and assembled with other parts to form an aircraft 10.

Method 200 provides a technical benefit over prior techniques and systems, because it enables lamination throughput to be multiplicatively enhanced. Because more lamination heads 134 operate at once on the laminate 120 for composite parts 55, 55-1 contemplated the laminate 120 for a twenty-five to forty-foot long half-barrel section preform 24-1, or a laminate 509 for a wing panel 510 of FIG. 5, the layup time for these parts is reduced. Wing panel 510 corresponds to wing panel 30 after hardening and post hardening assembly. Furthermore, because the parts proceed along the fabrication environment 100, transportation time adds little to non-value added time.

FIG. 2B is a flowchart illustrating a method 250 for selecting splice locations at a laminate in an illustrative embodiment. Step 252 includes subdividing a design for a laminate into zones for lamination heads 134 (e.g., zone Z2A, Z2B, Z2C, Z3A, Z3B, Z3C of FIG. 3B), such that different zones receive layup from different lamination heads 134. Step 254 comprises identifying contiguous regions (e.g., contiguous regions 377 of FIG. 3B) within the laminate that have a ply count less than an average ply count within the laminate. In step 256, a controller places splices zones 190, 123-5 into the design between the zones (e.g., zone Z2A, Z2B, Z2C, Z3A, Z3B, Z3C of FIG. 3B) within the contiguous regions. In step 258, the laminate 120 is laid-up according to the design. Method 250 provides a technical benefit by reducing layup complexity. That is, the addition of splice zones 190, 123-5 does not substantially increase the complexity of the existing layup, nor does the addition of splice zones 190, 123-5 increase the complexity of regions that are already highly complex (e.g., regions near windows, doors, etc.).

FIG. 2C depicts another method 260 for selecting splice locations at a laminate in an illustrative embodiment. Step 262 comprises cutting an applied tow 124, 124-1 to a length to facilitate splice zones 190, 123-5 between the zone one 115, zone two 117 and zone three 117-1 and longitudinal region 123, 123-1 assigned to different lamination heads 134 in a design for a laminate 120, 509. In one embodiment, the layup splice 392 is formed from a combination of angled butts 385, 386 that are staggered at overlaps 399, 399-1 across plies 396, 398, 397 (as shown in FIG. 2E, 2F, 2G, 2H). Step 264 comprises identifying a neighboring ply 398. A neighboring ply 398 comprises an adjacent ply in the laminate 120, 509. Step 266 comprises overlapping 399, 399-1 a trim position for the neighboring ply 398 from the prior ply 396 length layup splice 392. In an embodiment, overlapping 399 a tow 124, 124-1 may comprise changing an angle of the tow 124, 124-1 trim, or offsetting the layup splice 392 for ply 396 from layup splice 394 for adjacent ply 398.

FIG. 2D is a flowchart illustrating a method 270 for staggering layup splices 392, 394, 395 in an illustrative embodiment, and is described with reference to FIG. 2E. FIG. 2E, 2G corresponds with view arrows 2E and 2G of FIG. 1B. Step 272 includes inserting a layup splice 392 into a ply 396 at a splice zone 190 between the zone one 115, zone two 117 and zone three 117-1 assigned to different lamination heads 134 in a design for a laminate 120, and step 274 includes identifying a neighboring ply 398 that is adjacent to ply 396 of the laminate 120. Step 276 includes offsetting a cut position of layup splice 394 for the neighboring ply 398 from the trimmed length of ply 396. This may be performed by overlapping 399 the layup splice 394 by a predetermined amount. A layup splice 392 within splice zone 190 refers to layup splice 392 within ply 396 within longitudinal region 123, 123-1 and zone one 115 and zone two 117 laid up with different lamination heads 134. The layup splice 394 for a ply 398 is staggered with respect to a subsequent layup splice 395 in ply 397 and prior ply 396 layup splice 392 within splice zone 190. In FIG. 2G, the lap splice 392-1 within splice zone 123-5 refers to splice 392-1 within ply 396-1 within longitudinal region 123, 123-1 and zone one 115 and zone two 117 laid up with different lamination heads 134. The layup splice 394-1 for a ply 398-1 is staggered with respect to a subsequent layup splice 395-1 in ply 397-1 and prior ply 396-1 lap splice 392-1 within splice zone 123-5. Steps 272-276 may be repeated for plies until layup splice 392, 394, 395 proceed through the entire laminate 120 at overlaps 399. In one embodiment, the splice zone 123-5 is formed from a combination of layup splices 392, 394, 395, and are staggered across plies 396, 398, 397. Method 270 provides a technical benefit by distributing plies 396, 398, 397 across splice zone 123-5 at overlaps 399.

In further embodiments, the method includes operating multiple lamination heads 134 that place material on zone two 117 and zone three 117-1 of the laminate 120, while operating a single lamination head 134 for placing material on the zone one 115 of the laminate 120. In a still further embodiment, the method includes selecting an amount of overlap 399, 399-1 between different plies 396, 398, 397 of the layup splice 392, 394, 395.

In yet another embodiment, the method further includes selecting an amount of stagger between cuts in different layers of the splice. In some embodiments, the splice zones 190, 123-5 have layup splices 392, 394, 395, staggered by overlaps 399, 399-1 from adjacent plies from plies 396, to ply 398 to ply 397 and so on through laminate 120. In this arrangement, tows 124, 124-1 of individual plies within splice zones 190, 123-5, such as ply segment 393 are terminated at layup splice 392 with an angled butt 385, 386 and a non-angled butt 387, 387-1 configuration as part of a lap splice 392-1 with no separation or a small separation (e.g., a fraction of an inch) from ply segment 393-1 at layup splice 392. The layup splice 392 has ply segment 393 and ply segment 393-1 cut and placed into a complementary angled butt 385, 386 and a non-angled butt 387, 387-1 configuration as part of a lap splice 392-1 with overlaps 399, 399-1 staggering in relation to the layup splice 394. This type of overlaps 399, 399-1 staggering of subsequent layup splices 392, 394, 395 provides the lap splicing 392-1 that facilitates load transfer through splice zones 190, 123-5. Another embodiment has the splice in a scarf or step lap configuration (not shown). All splice types require the ply segment 393 and ply segment 393-1 to be trimmed into complementary alignment. Ply 396 has a layup splice 392 staggered from the ply 398 layup splice 394 and so forth for each subsequent ply of laminate 120. Furthermore, splice zones 190, 123-5 are located in less complex or thinner portions of the laminate 120, such as areas without window/door surrounds, pad ups or other complicated geometries. In this manner, splices are positioned between complex layup areas instead of within those areas. A splice may be thicker than the thickness of an un-spliced laminate 120, and hence the splice may comprise staggered joins of one or more cuts portions of ply through the thickness of the laminate 120. In further embodiments, the locations of cuts for individual plies 396, 398, 397 within a layup splice 392, 394, 395 are staggered relative to angled butt 385, 386 and non-angled butt 387, 387-1 for other plies in the splice zone 190, 123-5. This causes the layup splice 392, 394, 395 to be staggered across a distance of a multiple of overlap 399, 399-1, which enhances load bearing properties of the lap splice 392-1. Staggering the positions of cuts of plies within a splice zone 190, 123-5 enhances the ability of the splice zone 190, 123-5 to bear load there through when hardened into a composite part 55, 55-1. After receiving layup, the layup mandrel 110 proceeds to an autoclave 193.

FIG. 2F depicts angled butts 385, 385-1, 386 overlapped 399-1 between zones in an illustrative embodiment. As shown in FIG. 2F, a first zone 381 and a second zone 382 include an upper ply 383, 383-1 and a lower ply 384, 384-1. An angled butt 385 at the upper plies 383, 383-1 is disposed at the overlap 399-1 from an angled butt 386 for the lower plies 384, 384-1. Angled butt 385, 385-1, 386 are at angle 386-2 of 45 degrees as illustrated. In other embodiments, the angle 386-2 of angled butt 385, 385-1, 386 is set at any angle between about 20 and 90 degrees as long as the angled butt 385, 385-1, 386 are set to maintain a minimum overlap 399-1. The 385, 385-1 FIG. 2G depicts overlapping non-angled butts 387, 387-1, 387-2 between zones in an illustrative embodiment. As shown in FIG. 2H, a first zone 381 and a second zone 382 include an upper ply 383, 383-1 and a lower ply 384, 384-1. The non-angled butt 387 at the upper plies 383, 383-1 is disposed at the overlap 399 from an angled butt 387-1 for the lower plies 384, 384-1.

Figure 3B:
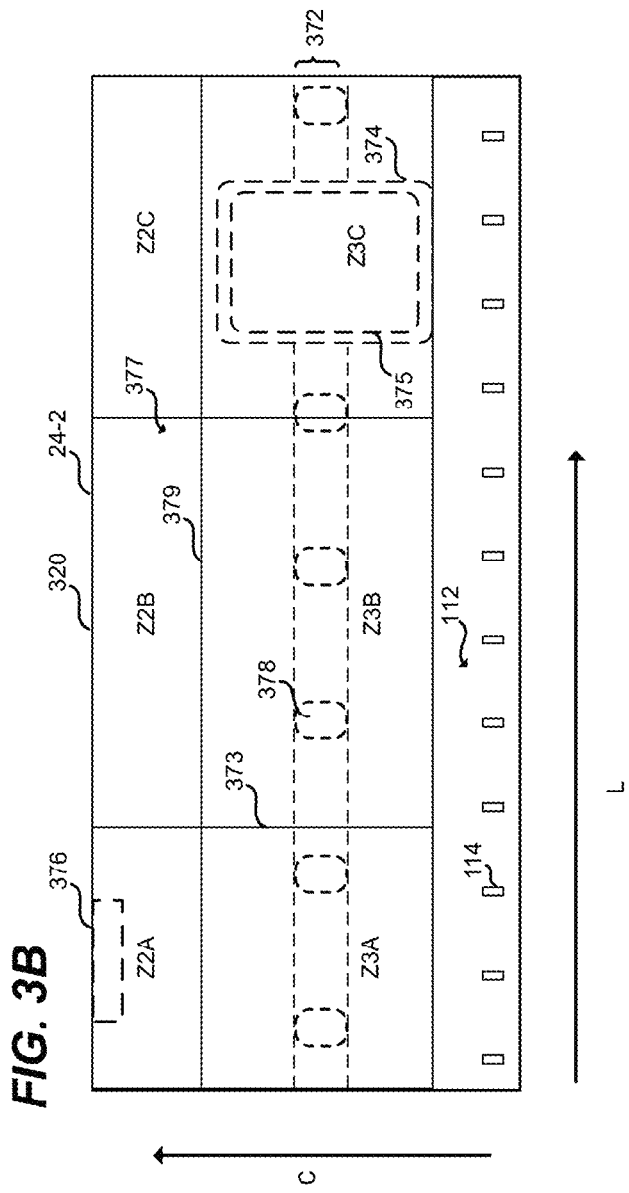
FIG. 3B is a side view of the fabrication environment of FIG. 3A in an illustrative embodiment.

FIG. 3B is a side view of the half barrel section 24-2 from the same view angle as FIG. 1B on FIG. 3A, but after separation from layup mandrel 110. Half barrel section 24 corresponds to half barrel section 24-2 except post hardening assembly has proceeded to completion.

In FIG. 3B, zones are separated both radially and longitudinally, resulting in zones Z2A, Z2B, and Z2C, which are disposed over zones Z3A, Z3B, and Z3C. Contiguous regions 377 have a ply count lower than an average ply count through the laminate. Zones Z3A, Z3B, and Z3C include a pad-up 372 for a window belt where window cut-out region 378 will be placed. However, the pad-up 372 is interrupted by window cut-out region 378 where material will be cut from the laminate 320, corresponds to laminate 120, to enable installation of a window. Zone Z3C includes a pad-up 374 for a door and a door cut-out region 375 for a door to be installed into. Meanwhile, zone Z2A includes a pad-up 376 for a crown module. Further and more complex arrangements of plies within each zone may be implemented during design as desired. Longitudinal splices 379, correspond to splice zone 190, are placed between the zones in the contiguous regions 377 and proceed in a longitudinal direction L. Longitudinal splices 379 have a predetermined width, although they are shown as lines in FIG. 3B. Furthermore, circumferential splices 373, correspond to splice zone 123-5 are placed between the zones, and proceed in a circumferential direction C around the laminate 320.

That is, after each micro pulse or pulse, the lamination heads 134 switch their direction of operation from counter-clockwise to clockwise or vice versa. Thus, all of the lamination heads 134 work counterclockwise, then wait for a micro pulse or pulse, then work clockwise, then wait for a micro pulse or pulse, and so on. This may be performed without any type of "carriage return" or return from a counterclockwise trip placing tow 124, 124-1 to a clockwise return trip during a single micro pulse and pause sequence. To place tows 124, 124-1 of different fiber orientations, a combination of movement of the track 132, the layup mandrel 110, and/or the lamination heads 134 may be performed.

In another embodiment, the lamination heads 134 perform layup in the clockwise direction 64 until reaching the end of their radial zone (e.g., Z1, Z2, Z3), and then reset counter-clockwise 65 back to the beginning of their radial zone (e.g., Z1, Z2, Z3) in a manner similar to operating a carriage return of a typewriter. Thus, the lamination heads 134 all work clockwise 64 after a micro pulse or pulse, then return to their starting positions and work clockwise (CW) again after a next pulse. Similar operations may of course be performed for counterclockwise 65 operation instead of clockwise 64. In still further embodiments, plies (e.g., plies 126, plies 128 of FIG. 1B) are laid-up longitudinally (along dimension L)

by motion of the track 132, the lamination heads 134, or the pulsed motion (P) of the layup mandrel 110 underneath.

In still further embodiments, after the structure (i.e., layup mandrel 110) has been pulsed (P), the lamination heads 134 move incrementally in one direction (e.g., clockwise 64, counterclockwise 65), and perform layup during these movements, as they each proceed across their zones (Z1, Z2, Z3). Then the lamination heads 134 move in an opposite direction back to a starting point 338 during a micro pulse or pulse/pause cycle in order to prepare for additional layup. The layup mandrel 110 may then be pulsed to a next lamination station 130, and the lamination heads proceed to place lamination material in a counterclockwise direction 65.

In yet further embodiments wherein the layup mandrel 110 is continuously moved in the process direction 180 (e.g., at a rate of an inch per minute), a combination of movement of the track 132, the layup mandrel 110, and/or the lamination heads 134 may be performed in order for layup to be performed onto the moving mandrel.

While zone one 115, zone two 117, and zone three 117-1, of roughly sixty-degrees each, are depicted in FIG. 3A, as are splices 190 and splices 123-5, which structurally unite the zone one 115, zone two 117, and zone three 117-1. Any suitable number of zone one 115, zone two 117, and zone three 117-1 may be chosen, and the number and size of zone one 115, zone two 117, and zone three 117-1 may vary along the length 181-7 of the layup mandrel 110 or with respect to each other in the same lengthwise portion 318 of the layup mandrel 110. Still further, in some embodiments certain zone one 115, zone two 117, and zone three 117-1 may be skipped by certain lamination stations 130. For example, one lamination station 130 may perform layup in zone two 117 and zone three 117-1 but not in zone one 115, while a downstream 181-2 lamination station 130 may perform layup in zone one 115, zone two 117, and zone three 117-1. This may accommodate environments where zone two 117 and zone three 117-1 have more plies than Z2 in the laminate. In still further embodiments, the layup mandrel 110 may be designed for a full barrel section 29-1, 29-2, 29-3, 29-4, 29-5, a quarter-barrel section of fuselage, or any suitable arcuate portion of fuselage. In further embodiments, zonal sizes 317 are selected such that each zone takes a similar (or the same) amount of time to layup at each lamination station 130. This facilitates a common takt time for each lamination station 130 facilitating a more even division of work between lamination stations 130. In such embodiments, zones with more plies, or zones that require more complex layup patterns, are made smaller than zones which are thinner or less complex.

In an embodiment, during lamination station 130 or lamination head 134 down time lamination heads 134 are eligible for servicing such as by re-loading the lamination heads 134 with new tows, replacing or cleaning cutters at the lamination heads 134, replacing entire lamination heads, etc. Servicing could be a factor in dividing work load and creating the common takt for the line with scheduled down time for lamination stations 130 or lamination heads 134 made a part of the process to create laminate 120 or laminate 509. In such embodiments, an amount of material laid-up in each zone is chosen to be less than a maximum rate of the lamination head 134 servicing the zone with the remaining down time left for servicing. In this manner, the lamination head 134 may be serviced during any associated down-time when layup is not occurring.

Figure 4A:
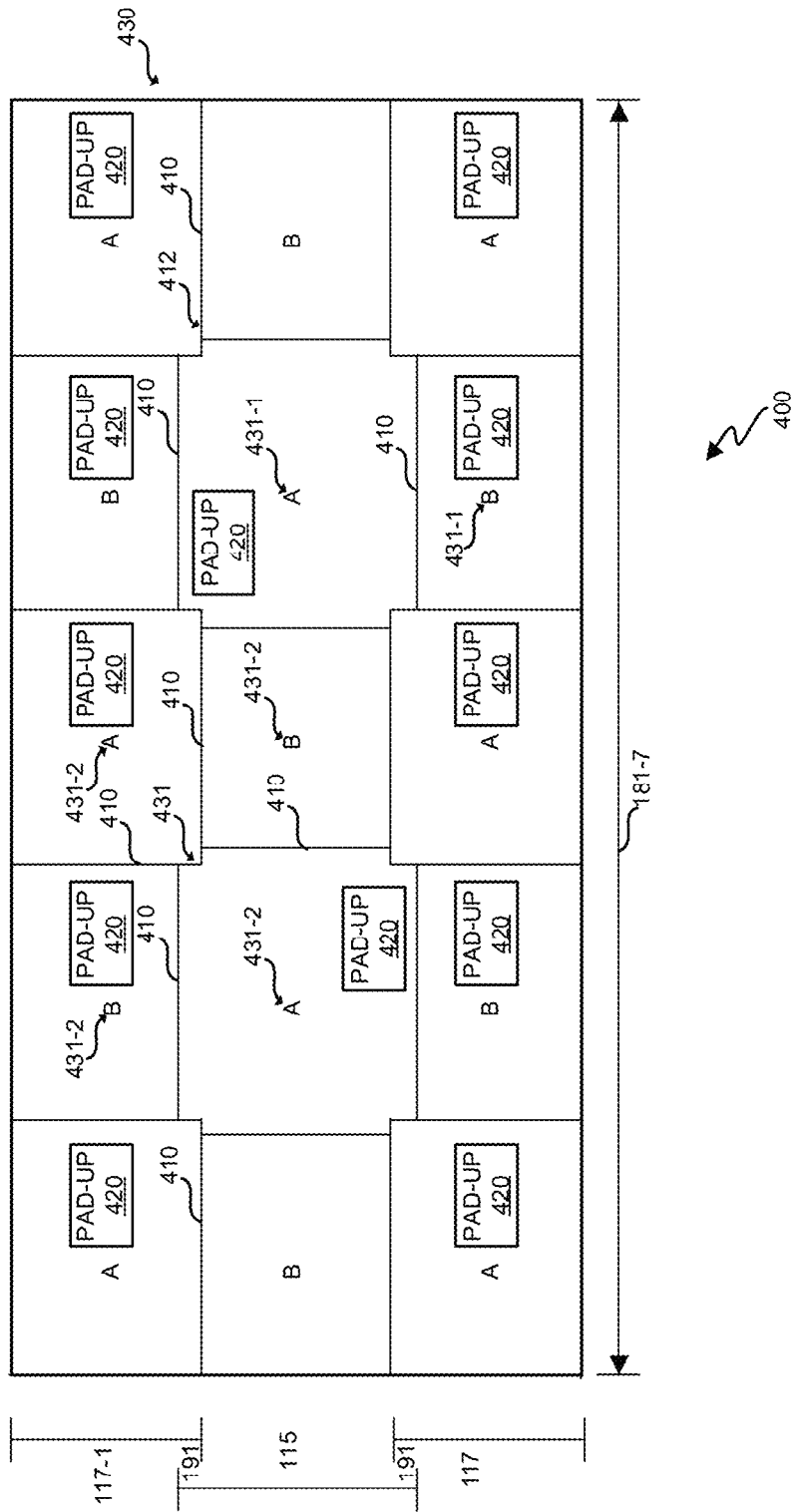
FIG. 4A is a top view of a ply map for a laminate for a section of fuselage in an illustrative embodiment.

FIG. 4A is a top view of a ply map 400 for a laminate 120 after placement of all tows 124, 124-1 in an embodiment as illustrated. FIG. 4A corresponds with view arrows 4 of FIG. 3A. According to FIG. 4A, ply map 400 includes zones A, which are utilized by a first lamination station 130, as well as zones B, which are utilized by a second lamination station 130-1. Splices 410 between the zone one 115, zone two 117, and zone three 117-1 vary along the length 181-7 of the ply map 400, forming a staggered pattern 430 and preventing a single seam from being formed along the length 181-7 of the ply map 400. Overlap zone 191 occurs between zone one 115 and zone two 117 and between zone one 115 and zone three 117-1. While either first lamination station 130 and second lamination station 130-1 can form splices between zones A and zone B, the ply map 400 has the ply segment 393 placed by lamination station 130 and ply segment 393-1 placed by lamination station 130-1 for layup splice 392. That is, zonal lamination is performed such that boundaries 412 between zones are staggered across layers in order to avoid layup splice 392 in laminate 120 or laminate 509. In further embodiments, zones A and B overlap in angled shapes depending on the fiber orientation of material being laid-up and a local configuration of the structure being laid up.

Each splice 410 may be worked upon by multiple lamination heads 134 dedicated to a particular zone one 115, zone two 117, and zone three 117-1. For example, portions of a splice 410 located between two zones 431-1 may receive layup from two lamination heads 134 (one for each zone one 115 and zone two 117 or zone one 115 and zone three 117-1)) at different times. The portions of a splice 410 at a corner 431 between four zones 431-2 may receive layup from four lamination heads 134 (one for each zone one 115, zone two 117 and zone three 117-1) at different times. While the splices 410 are shown as lines, each splice 410 occupies a splice zone 190, 123-5 between neighboring zones where plies from the zones are spliced, or otherwise made physically integral with each other. That is, the location of a splice 410 changes incrementally between layers, forming a staggered pattern 430 (e.g., stair step pattern, staggered shape, etc.) through laminate 120. The staggered pattern 430 of splice 410 prevents overlap splice 392-2 from stacking directly upon prior lap splice 392-1 or subsequent overlap splice 392-3 and also helps to prevent an undesired thickening of the laminate 120 within splice zone 190. Thus, the location of the layup splice 392, 394, 395 for splice 410 vary between plies in one embodiment. The splices 410 extend across a thickness of laminate 120. The splices 410 are selected/placed such that they do not intersect the pad-ups 420, in order to prevent substantial increases in thickness or complexity near pad-ups 420. Thus, the boundaries 412 are staggered from ply 396 to ply 398 to form staggered pattern 430 for each ply 396, 398, 397.

Figure 4B:
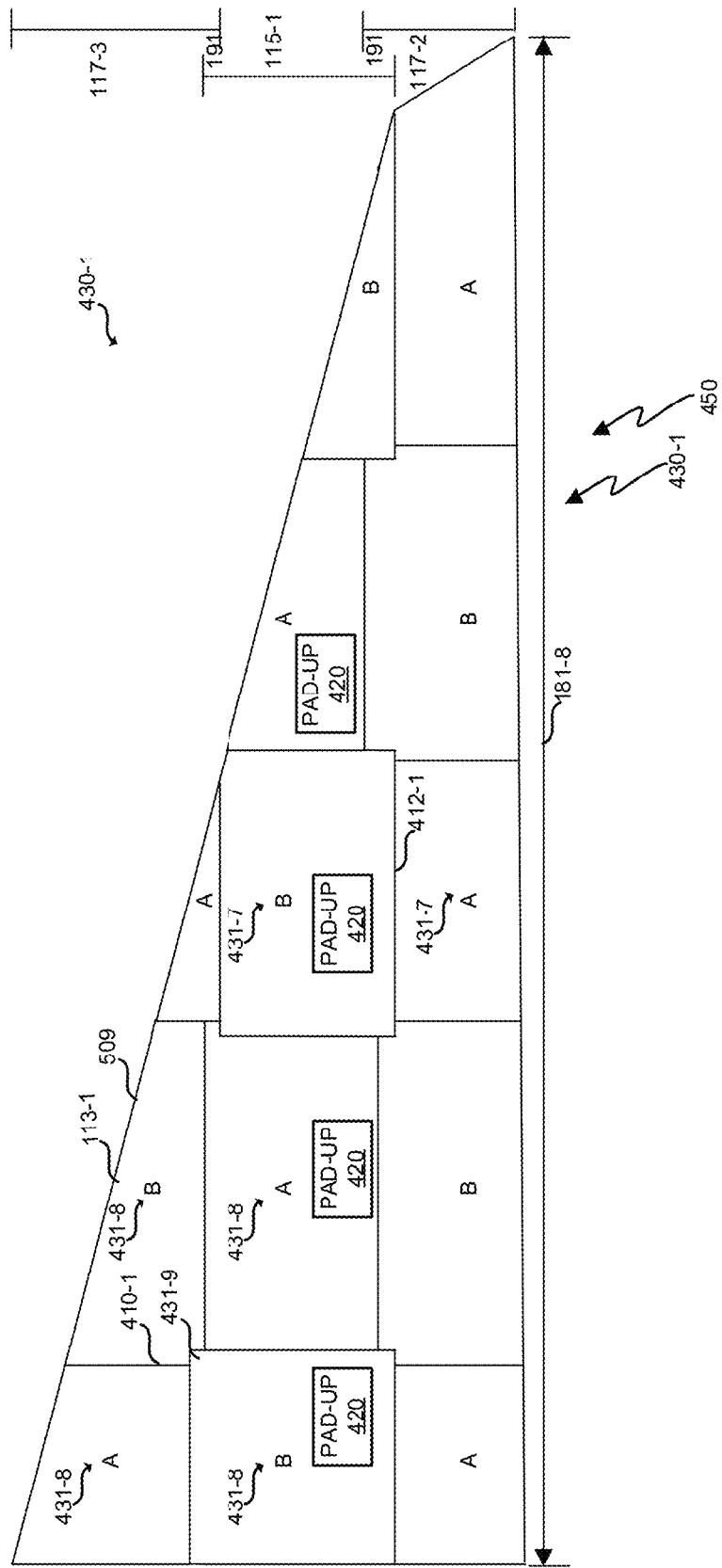
FIG. 4B is a top view of a ply map for a laminate for a wing panel in an illustrative embodiment.

FIG. 4B illustrates a similar arrangement of zones A and B, as well as splices 410 of a ply map 450 for a wing panel. Pad-ups 420 are also included in the ply map 450, and may be utilized to provide reinforcement for access panels, rib lands, spar lands, etc. FIGS. 4A-4B illustrate that the zonal lamination techniques discussed herein can be utilized for a variety of laminate designs. FIG. 4B is a top view of a ply map 450 for a laminate 509 after placement of all tows 124, 124-1 in an embodiment that corresponds to wing panel 30 prior to hardening. According to FIG. 4B, ply map 450 includes zones A, which are utilized by a first lamination station 130, as well as zones B, which are utilized by a second lamination station 130-1. Splices 410-1 between the zone one 115-1, zone two 117-2, and zone three 117-3 vary along the length 181-8 of the ply map 450, forming a staggered pattern 430-1 and preventing a single seam from being formed along the length 181-8 of the ply map 450.

Overlap zone 191 occurs between zone one 115-1 and zone two 117-2 and between zone one 115-1 and zone three 117-3. While either first lamination station 130 and second lamination station 130-1 can form splices between zones A and zone B, the ply map 450 has the ply segment 393 placed by lamination station 130 and ply segment 393-1 placed by lamination station 130-1 for layup splice 392. That is, zonal lamination is performed such that boundaries 412-1 between zones are staggered across layers in order to avoid layup splice 392 in laminate 509. In further embodiments, zones A and B overlap in angled shapes depending on the fiber orientation of material being laid-up and a local configuration of the structure being laid up.

Each splice 410-1 may be worked upon by multiple lamination heads 134 dedicated to a particular zone one 115-1, zone two 117-2, and zone three 117-3. For example, portions of a splice 410-1 located between two zones 431-7 may receive layup from two lamination heads 134 (one for each zone one 115-1 and zone two 117-2 or zone one 115-1 and zone three 117-3) at different times. The portions of a splice 410-1 at a corner 431-9 between four zones 431-8 may receive layup from four lamination heads 134 (one for each zone one 115-1, zone two 117-2 and zone three 117-3) at different times. While the splices 410-1 are shown as lines, each splice 410-1 occupies splice zones 190, 123-5 between neighboring zones where plies from the zones are spliced, or otherwise made physically integral with each other. That is, the location of a splice 410-1 changes incrementally between layers, forming a staggered pattern 430-1 (e.g., stair step pattern, staggered shape, etc.) through laminate 509. The staggered pattern 430-1 of splice 410-1 prevents overlap splice 392-2 from stacking directly upon prior lap splice 392-1 or subsequent overlap splice 392-3 and also helps to prevent an undesired thickening of the laminate 509 within splice zone 190. Thus, the location of the layup splice 392, 394, 395 for splice 410-1 vary between plies in one embodiment. The splices 410-1 extend across a thickness of laminate 509. The splices 410-1 are selected/placed such that they do not intersect the pad-ups 420, in order to prevent substantial increases in thickness or complexity near pad-ups 420. Thus, the boundaries 412 are staggered from ply 396 to ply 398 to form staggered pattern 430-1 for each ply 396, 398, 397.

FIGS. 5-6 are perspective views of a fabrication environment for laying up wing skins (e.g., wing panels 510 and 610) in an illustrative embodiment. Wing panel 510, 610 corresponds to wing panel 30 after hardening and post hardening assembly. According to FIG. 5, a wing panel 510 is subdivided into zones 117-3, 115-1, 117-2 from fore to aft in a fabrication environment 500. Lamination heads 522 at lamination stations 520 proceed along tracks 524 to perform layup in these zones 117-3, 115-1, 117-2. Splices 540 are placed between the zones 117-3, 115-1, 117-2. In further embodiments, lamination heads 522 at different lamination stations 520 operate at different portions of the wing panel 510 at the same time. For example, lamination heads 134 at different stations may perform layup at different zones, like zone 117-3, 115-1, 117-2. In this embodiment, lamination heads 522 are staggered between different lamination stations 520, such that lamination heads 522 at each lamination station 520 do not perform work upon adjacent zones 117-3, 115-1, 117-2, but rather perform work on every other zone 117-3, 115-1, 117-2.

According to FIG. 6, a wing panel 610 is subdivided into zones Z1, Z2, Z3 from outboard to inboard in a fabrication environment 600. Lamination heads 622 at lamination stations 620 proceed along tracks 624 to perform layup in these zones. The zones Z1, Z2, Z3 are made physically integral with each other via splices 640. Within each splice 640, plies from different zones overlap in a staggered manner. In further embodiments, more than three zones are implemented for each wing. Still further, zones Z1, Z2, Z3 may be separated in a combination of fore/aft (as shown in FIG. 5) and inboard/outboard (as shown in FIG. 6) delineations in a checkerboard pattern, and multiple lamination heads 522, 622 disposed across multiple lamination stations 520, 620 may operate on the wing panel 510, 610 as the wing panel 510, 610 proceeds in the process direction 180-1, 180-2 in order to increase fabrication rates. For example, each lamination station 520, 620 depicted in FIGS. 5-6 may include a lamination head 522, 622, and tracks 524, 624 for the lamination heads 522, 622 may be substantially flat or otherwise dimensioned to accommodate passage of the wing panel 510, 610. In further embodiments, lamination heads 522, 622 at different lamination stations 520, 620 operate at different portions of the wing panel 510, 610 at the same time. For example, lamination heads 622 at different lamination stations 620 perform layup at different zones Z1, Z2, Z3. In this embodiment, lamination heads 622 are staggered between different lamination stations 620, such that lamination heads 622 at each lamination station 620 do not perform work upon adjacent zones Z1, Z2, Z3, but rather perform work on every other zone Z1, Z2, Z3.

EXAMPLES

Referring more particularly to the drawings, embodiments of the disclosure may be described in the context of aircraft manufacturing and service in method 700 as shown in FIG. 7 and an aircraft 702 as shown in FIG. 8. During pre-production, method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine work in maintenance and service 716 (which may also include modification, reconfiguration, refurbishment, and so on). Apparatus and methods embodied herein may be employed during any one or more suitable stages of the production and service described in method 700 (e.g., specification and design 704, material procurement 706, component and subassembly manufacturing 708, system integration 710, certification and delivery 712, in service 714, maintenance and service 716) and/or any suitable component of aircraft 702 (e.g., airframe 718, systems 720, interior 722, propulsion system 724, electrical system 726, hydraulic system 728, environmental system 730).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 702 produced by method 700 may include an airframe 718 with a plurality of systems 720 and an interior 722. Examples of systems 720 include one or more of a propulsion system 724, an electrical system 726, a hydraulic system 728, and an environmental system 730. Any number of other systems may be included.

Although an aerospace example is shown, the principles of the invention may be applied to other industries, such as the automotive industry.

As already mentioned above, apparatus and methods embodied herein may be employed during any one or more of the stages of the production and service described in method 700. For example, components or subassemblies corresponding to component and subassembly manufacturing 708 may be fabricated or manufactured in a manner similar to components or subassemblies produced while the aircraft 702 is in service. Also, one or more apparatus embodiments, method embodiments, or a combination thereof may be utilized during the subassembly manufacturing 708 and system integration 710, for example, by substantially expediting assembly of or reducing the cost of an aircraft 702. Similarly, one or more of apparatus embodiments, method embodiments, or a combination thereof may be utilized while the aircraft 702 is in service, for example and without limitation during the maintenance and service 716. Thus, the invention may be used in any stages discussed herein, or any combination thereof, such as specification and design 704, material procurement 706, component and subassembly manufacturing 708, system integration 710, certification and delivery 712, in service 714, maintenance and service 716) and/or any suitable component of aircraft 702 (e.g., airframe 718, systems 720, interior 722, propulsion system 724, electrical system 726, hydraulic system 728, and/or environmental system 730.

In one embodiment, a part comprises a portion of airframe 718, and is manufactured during component and subassembly manufacturing 708. The part may then be assembled into an aircraft in system integration 710, and then be utilized in service 714 until wear renders the part unusable. Then, in maintenance and service 716, the part may be discarded and replaced with a newly manufactured part. Inventive components and methods may be utilized throughout component and subassembly manufacturing 708 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
    subdividing laying up of a laminate into zones;
    applying tows of fiber reinforced material for the laminate over a layup mandrel via multiple lamination heads such that each lamination head applies tows in a different zone;
    splicing the zones together to form the laminate during the laying up of the tows by cutting through applied tows and offsetting cut positions for neighboring plies of the cut applied tows; and
    moving the layup mandrel in a process direction during fabrication of the composite part.

2. The method of claim 1, wherein:
    the layup mandrel comprises a mandrel for a half-barrel section; and
    subdividing the laying up of the laminate into zones comprises assigning lamination head to zones.

3. The method of claim 1, wherein:
    the layup mandrel comprises a layup mandrel for a wing panel; and
    subdividing the laying up of the laminate into zones comprises assigning lamination heads to zones proceeding from a tip of the wing panel to a root of the wing panel.

4. The method of claim 1, wherein:
    the layup mandrel comprises a layup mandrel for a wing panel; and
    subdividing the laying up of the laminate into zones comprises assigning lamination heads to zones proceeding from a fore of the wing panel to an aft of the wing panel.

5. The method of claim 1, further comprising:
    applying additional tows of fiber reinforced material at the same time via the lamination heads such that each lamination head applies tows in a different zone.

6. The method of claim 1, further comprising:
    indexing the layup mandrel to the lamination heads; and
    applying additional tows of fiber reinforced material at the same time via the lamination heads, wherein each of the lamination heads applies tows in a new zone.

7. The method of claim 1, wherein:
    applying the tows comprises:
        operating the lamination heads along a shared track to lay up the tows.

8. The method of claim 1, wherein:
    applying the tows comprises:
        operating the lamination heads along individual tracks to lay up the tows.

9. The method of claim 1, wherein:
    applying the tows comprises:
        applying tows by a first lamination station and applying tows by a second lamination station.

10. The method of claim 1, further comprising:
    identifying regions at the laminate which will receive pad-ups, wherein:
        subdividing the laying up of the laminate into zones comprises assigning lamination heads to perform layup in each zone, and placing splices between the zones in locations that do not intersect pad-ups at the laminate.

11. The method of claim 1, wherein:
subdividing the laying up of the laminate into zones comprises assigning lamination heads to perform layup in each zone, and placing splices between the zones in a staggered pattern.

12. The method of claim 1, further comprising:
hardening the laminate onto the layup mandrel.

13. A method for designing a laminate, the method comprising:
subdividing a design for a laminate into zones for lamination heads, such that different zones receive layup from different lamination heads; and
placing splices into the design between the zones within contiguous regions by cutting through applied tows and offsetting cut positions for neighboring plies of the cut applied tows.

14. A method for inserting a splice into a laminate, the method comprising:
cutting through an applied tow to form a splice between zones assigned to different lamination heads in a design for a laminate;
identifying a neighboring ply; and
offsetting a cut position for the neighboring ply from the cut.

15. A method for fabricating a composite part from a laminate, the method comprising:
moving a layup mandrel in a process direction during fabrication of a composite part to expose zones for lamination-to-lamination heads;
subdividing the laying up of a laminate into zones;
applying tows of fiber reinforced material to a layup mandrel via multiple lamination heads such that each lamination head applies tows in a different zone; and
splicing the zones together to form a single laminate while applying the tows by cutting through applied tows and offsetting cut positions for neighboring plies of the cut applied tows.

16. The method of claim 15, wherein:
the layup mandrel comprises a mandrel for a half-barrel section; and
the subdividing the laying up of the laminate into zones comprises assigning lamination head to zones.

17. The method of claim 15, wherein:
the layup mandrel comprises layup mandrel for a wing panel; and
the subdividing the laying up of the laminate into zones comprises assigning lamination heads to zones proceeding from a tip of the wing panel to a root of the wing panel.

18. The method of claim 15, wherein:
the layup mandrel comprises a layup mandrel for a wing panel; and
the subdividing the laying up of the laminate into zones comprises assigning lamination heads to zones proceeding from a fore of the wing panel to an aft of the wing panel.

19. The method of claim 15, further comprising:
applying additional tows of fiber reinforced material at the same time via the lamination heads such that each lamination head applies tows in a different zone.

20. The method of claim 15, further comprising:
indexing the layup mandrel to the lamination heads; and
applying additional tows of fiber reinforced material at the same time via the lamination heads, wherein each of the lamination heads applies tows in a new zone.

21. The method of claim 15, wherein:
applying the tows comprises:
operating the lamination heads along a shared track to lay up the tows.

22. The method of claim 15, wherein:
applying the tows comprises:
operating the lamination heads along individual tracks to lay up the tows.

23. The method of claim 15, wherein:
applying the tows comprises:
applying tows by a first lamination station and applying tows by a second lamination station.

24. The method of claim 15, further comprising:
identifying regions at the laminate which will receive pad-ups, wherein:
the subdividing the laying up of the laminate into zones comprises assigning lamination heads to perform layup in each zone, and placing splices between the zones in locations that do not intersect pad-ups at the laminate.

25. The method of claim 15, wherein:
the subdividing the laying up of the laminate into zones comprises assigning lamination heads to perform layup in each zone, and placing splices between the zones in a staggered pattern.

26. The method of claim 15, further comprising:
hardening the laminate onto the layup mandrel.

27. A method for fabricating a composite part from a laminate, the method comprising:
subdividing the laying up of a laminate into zones;
moving a layup mandrel in a process direction;
applying tows of fiber reinforced material to the layup mandrel simultaneously via multiple lamination heads such that each lamination head applies tows in a different zone; and
splicing the zones together to form a single laminate while applying the tows by cutting through applied tows and offsetting cut positions for neighboring plies of the cut applied tows.

28. A method for fabricating a composite part from a laminate, comprising:
moving a layup mandrel in a process direction;
indexing the layup mandrel to laminations heads at lamination stations; and
applying tows of fiber reinforced material to the layup mandrel simultaneously via lamination heads at the lamination stations, wherein each of the lamination heads applies tows in an assigned zone at the layup mandrel, and lamination heads at different lamination stations apply tows in different assigned zones;
cutting through applied tows and offsetting cut positions for neighboring plies of the cut applied tows of contiguous assigned zones; and
repeating the moving, indexing, applying, and cutting.

29. A method for inserting a splice into a laminate, the method comprising:
inserting a cut into ply at a splice between zones assigned to different lamination heads in a design for a laminate;
identifying a neighboring ply; and
offsetting a cut position for the neighboring ply from the cut.

30. A method for fabricating a composite part, the method comprising:

identifying regions at a laminate which will receive pad-ups;
subdividing laying up of the laminate into zones assigning lamination heads to perform layup in each zone, and placing splices between the zones in a staggered pattern in locations that do not intersect pad-ups at the laminate;
applying tows of fiber reinforced material for the laminate over a layup mandrel by a first lamination station and a second lamination station by operating multiple lamination heads along a shared track or along individual tracks to lay up the tows such that each lamination head applies tows in a different zone, wherein the layup mandrel comprises a layup mandrel for a wing panel and subdividing the laying up of the laminate into zones comprises assigning lamination heads to zones proceeding from a tip of the wing panel to a root of the wing panel or from a fore of the wing panel to an aft of the wing panel;
splicing the zones together to form the laminate during the laying up of the tows by cutting through applied tows and offsetting cut positions for neighboring plies of the cut applied tows;
moving the layup mandrel in a process direction during fabrication of the composite part;
indexing the layup mandrel to the lamination heads;
applying additional tows of fiber reinforced material at the same time via the lamination heads such that each lamination head applies tows in a new zone; and
hardening the laminate onto the layup mandrel.

31. A method for designing a laminate, the method comprising:
subdividing a design for a laminate into zones for lamination heads, such that different zones receive layup from different lamination heads;
selecting an amount of overlap between plies in different layers of a splice;
selecting an amount of stagger between cuts in different layers of the splice;
placing splices into the design between the zones within contiguous regions, wherein the splices are formed from staggered cuts;
operating multiple heads that place material on sides of the laminate, while operating a single head for placing material on a crown modular of the laminate;
laying up the laminate according to the design; and
identifying contiguous regions within the laminate that have a ply count less than an average ply count.

32. A method for fabricating a composite part from a laminate, the method comprising:
identifying regions at the laminate which will receive pad-ups;
moving a layup mandrel in a process direction during fabrication of a composite part to expose zones for lamination-to-lamination heads, wherein the layup mandrel is a layup mandrel for a section of fuselage or a wing panel;
subdividing the laying up of a laminate into zones by assigning lamination heads to zones that comprise arcuate portions of the section of fuselage or that proceed from a tip of the wing panel to a root of the wing panel or that proceed from a fore of the wing panel to an aft of the wing panel by placing boundaries between the zones in a staggered pattern in locations that do not intersect pad ups at the laminate;
applying tows of fiber reinforced material to a layup mandrel by operating multiple lamination heads along a shared track to lay up the tows such that each lamination head applies tows in a different zone;
splicing the zones together to form a single laminate while applying the tows by cutting through applied tows and offsetting cut positions for neighboring plies of the cut applied tows;
moving the layup mandrel further in the process direction;
applying additional tows of fiber reinforced material to the layup mandrel simultaneously via the lamination heads such that each lamination head applies tows in a different zone;
moving the layup mandrel further in the process direction;
indexing the layup mandrel to the lamination heads;
applying additional tows of fiber reinforced material to the layup mandrel simultaneously via the lamination heads, wherein each of the lamination heads applies tows in a new zone; and
hardening the laminate onto the layup mandrel.

33. A method for fabricating a composite part from a laminate, the method comprising:
identifying regions at the laminate which will receive pad-ups;
subdividing the laying up of a laminate into zones by placing boundaries between the zones in a staggered pattern in locations that do not intersect pad ups at the laminate;
applying tows of fiber reinforced material to a layup mandrel simultaneously in series and in parallel by operating multiple lamination heads along a shared track and moving the layup mandrel in a process direction such that each lamination head applies tows in a different zone, wherein the layup mandrel comprises a layup mandrel for a section of fuselage or a wing, wherein subdividing the laying up of a laminate into zones comprises subdividing the layup mandrel into arcuate portions of the section of fuselage or into portions proceeding from a tip of the wing to a root of the wing or into portions proceeding from a fore of the wing to an aft of the wing;
splicing the zones together to form a single laminate while applying the tows by cutting through applied tows and offsetting cut positions for neighboring plies of the cut applied tows;
moving the layup mandrel in a process direction;
indexing the layup mandrel to the lamination heads;
applying additional tows of fiber reinforced material to the layup mandrel simultaneously via the lamination heads such that each lamination head applies tows in a new zone; and
hardening the laminate onto the layup mandrel.

34. A method for fabricating a composite part from a laminate, comprising:
moving a layup mandrel in a process direction;
indexing the layup mandrel to laminations heads at lamination stations; and
applying tows of fiber reinforced material to the layup mandrel simultaneously by operating lamination heads independently along a shared track to lay up the tows at the lamination stations, wherein each of the lamination heads applies tows in an assigned zone at the layup mandrel, and lamination heads at different lamination stations apply tows in different assigned zones, wherein the zone assigned to each lamination head varies as the layup mandrel proceeds in the process direction; and
splicing the zones together while applying the tows by cutting through applied tows and offsetting cut positions for neighboring plies of the cut applied tows; and
repeating the moving, indexing, applying, and splicing.

* * * * *